US009156202B2

(12) United States Patent
Tanigawa et al.

(10) Patent No.: US 9,156,202 B2
(45) Date of Patent: Oct. 13, 2015

(54) FILAMENT WINDING METHOD AND FILAMENT WINDING APPARATUS

(71) Applicant: MURATA MACHINERY, LTD., Kyoto-shi, Kyoto (JP)

(72) Inventors: Motohiro Tanigawa, Kyoto (JP); Tadashi Uozumi, Kyoto (JP); Daigoro Nakamura, Kyoto (JP); Ken Hatta, Toyota (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/312,897

(22) Filed: Jun. 24, 2014

(65) Prior Publication Data

US 2014/0299274 A1 Oct. 9, 2014

Related U.S. Application Data

(62) Division of application No. 13/614,874, filed on Sep. 13, 2012, now Pat. No. 8,980,033.

(30) Foreign Application Priority Data

Sep. 16, 2011 (JP) ................. 2011-203621
Sep. 16, 2011 (JP) ................. 2011-203638

(51) Int. Cl.
*B29C 53/56* (2006.01)
*B29C 63/08* (2006.01)
*B29C 53/60* (2006.01)
*B29C 53/80* (2006.01)
*B65H 54/02* (2006.01)
*B29C 53/66* (2006.01)
*B29C 63/24* (2006.01)

(52) U.S. Cl.
CPC ............... *B29C 63/08* (2013.01); *B29C 53/602* (2013.01); *B29C 53/8016* (2013.01); *B65H 54/02* (2013.01); *B29C 53/66* (2013.01); *B29C 63/24* (2013.01)

(58) Field of Classification Search
CPC ........ B29C 63/08; B29C 63/24; B29C 53/66; B29C 53/8016; B29C 53/602; B65H 54/02
USPC .............. 156/175, 350, 352, 380.7, 443, 446, 156/450, 510, 538, 539; 242/474, 430, 242/432.6, 410, 434.9, 478.2, 478.3
See application file for complete search history.

(56) References Cited

U.S. PATENT DOCUMENTS 6,736,168 B2    5/2004   Amano et al.
8,113,457 B2    2/2012   Tanigawa et al.
2009/0314418 A1*  12/2009  Uozumi et al. ............... 156/172

FOREIGN PATENT DOCUMENTS

JP    H09183164 A    7/1997
JP    2007260973 A   10/2007

(Continued)

*Primary Examiner* — Jacob T Minskey
*Assistant Examiner* — Vishal I Patel
(74) *Attorney, Agent, or Firm* — DLA Piper LLP (US)

(57) ABSTRACT

A filament winding method performs a hoop winding step including a first step of fixing an end of a fiber bundle to a liner surface at a starting position of hoop winding, a second step of hoop winding the fiber bundle having the end fixed to the liner surface in the first step, a third step of fixing the fiber bundle hoop wound in the second step to the liner surface at an ending position of hoop winding, and a fourth step of cutting the fiber bundle upstream in a fiber bundle supplying direction of the position where the fiber bundle is fixed in the third step.

8 Claims, 23 Drawing Sheets

(56) References Cited

FOREIGN PATENT DOCUMENTS

| | | |
|---|---|---|
| JP | 2007320193 A | 12/2007 |
| JP | 2009174554 A | 8/2009 |
| JP | 2009174700 A | 8/2009 |
| JP | 2009184223 A | 8/2009 |
| JP | 2009191927 A | 8/2009 |
| JP | 2010234529 A | 10/2010 |

* cited by examiner

FILAMENT WINDING METHOD AND FILAMENT WINDING APPARATUS

CROSS-REFERENCE TO RELATED APPLICATIONS

This application is a divisional of U.S. non-provisional application Ser. No. 13/614,874, filed on Sep. 13, 2012, which claims priority under 35 U.S.C. 119 to Japanese Patent Application Nos. 2011-203621, filed on Sep. 16, 2011, and 2011-203638, filed on Sep. 16, 2011, which applications are hereby incorporated by reference in its entirety.

BACKGROUND OF THE INVENTION

1. Field of the Invention

The present invention relates to a filament winding method and a filament winding apparatus.

2. Description of the Related Art

A known filament winding apparatus includes a hoop winding device and a helical winding device, and winds a fiber bundle around a periphery of a liner to form a reinforcement layer by repeatedly performing hoop winding and helical winding with respect to the liner alternately (e.g., US Patent Publication No. US/2010/032510A1).

In a conventional hoop winding device, when the hoop winding is finished, the hoop winding device is moved to a retreated position located away from the liner with the hoop-wound fiber bundle still connected to a liner surface. The helical winding is then carried out over the hoop winding, and when the helical winding is finished, the hoop winding device is moved to a position to start the next hoop winding. In this case, the movement is started while carrying out easy winding from the retreated position. Easy winding is a winding method carried out when moving the hoop winding device while winding the fiber bundle, and the easy-wound fiber bundle is not involved in the formation of the reinforcement layer.

After the hoop winding device is moved to an end of the liner while performing the easy winding, the hoop winding device starts combination winding. Combination winding is a winding method of gradually moving a winding position of the fiber bundle to a hoop winding starting position while alternately winding the fiber bundle around both ends of the liner a plurality of times (e.g., Japanese Unexamined Patent Publication No. 2009-174700).

Combination winding is carried out because the fiber bundle slips and cannot be wound even if the hoop winding is carried out at an inclined portion such as a dome portion of the liner. Thus, the fiber bundle can be wound around the dome portion by winding the fiber bundle at an angle of pulling the fiber bundle in an axial direction of the liner by combination winding, and the angle is gradually changed to the angle of hoop winding at a tubular portion of the liner where the fiber bundle does not slip.

As described above, in a conventional filament winding apparatus, since hoop winding and helical winding are continuously performed, the hoop-wound fiber bundle remains connected to the liner surface without being cut when the hoop winding is finished and the helical winding is to be carried out next. Therefore, an operator is not required to fix the fiber bundle to the liner surface by manual operation when carrying out hoop winding next.

However, when helical winding is finished and the next hoop winding is to be carried out, the hoop winding device is moved while carrying out easy winding and combination winding of the fiber bundle from the retreated position to the hoop winding starting position. Thus, if the hoop-wound fiber bundle remains connected to the liner surface without being cut, the time to carry out easy winding and combination winding of the fiber bundle becomes necessary, which may lengthen the time required for hoop winding. Easy winding and combination winding of the fiber bundle are hardly involved in the formation of the reinforcement layer of the liner. Thus, an excessive fiber bundle is used, which may lead to increase in manufacturing cost.

BRIEF SUMMARY OF THE INVENTION

The present invention contributes to reduction of the time required for hoop winding since easy winding and combination winding of the fiber bundle are not necessary when starting hoop winding, regardless of whether or not a fiber layer is formed on a liner. The present invention also contributes to reduction of usage amount of the fiber bundle and manufacturing cost since easy winding and combination winding of the fiber bundle are not necessary.

One embodiment of the present invention relates to a filament winding method for performing a hoop winding step. The hoop winding step includes a first step of fixing an end of a fiber bundle to a liner surface at a starting position of hoop winding, a second step of hoop winding the fiber bundle having the end fixed to the liner surface in the first step, a third step of fixing the fiber bundle hoop wound in the second step to the liner surface at an ending position of the hoop winding, and a fourth step of cutting the fiber bundle upstream in a fiber bundle supplying direction of a position where the fiber bundle is fixed in the third step.

According to this embodiment, when starting the hoop winding, the end of the fiber bundle is fixed to the liner surface to start the hoop winding at the starting position of the hoop winding. When ending the hoop winding, the fiber bundle is fixed to the liner surface to be cut at the ending position of the hoop winding. When starting the hoop winding in such a manner, the end of the fiber bundle is fixed to the liner surface to start the hoop winding at the starting position of the hoop winding. Consequently, easy winding and combination winding of the fiber bundle are not necessary and the time required for the hoop winding can be shortened. Furthermore, since easy winding and combination winding of the fiber bundle are not necessary, the usage amount of the fiber bundle can be reduced and the manufacturing cost can be reduced.

According to one example of the embodiment described above, the fiber bundle includes a thermosetting resin or a thermoplastic resin; and the fixation of the fiber bundle to the liner surface in the first step and the third step brings the fiber bundle into contact with the liner surface and heats a contacting portion.

According to this example, the fiber bundle includes a thermosetting resin or a thermoplastic resin, and the fixation of the fiber bundle to the liner surface brings the fiber bundle into contact with the liner surface and heats the contacting portion. The thermosetting resin or the thermoplastic resin is thereby cured or welded, and the fiber bundle can be fixed to the liner surface.

According to another example of the embodiment described above, the second step includes, a fifth step of starting the hoop winding with a tension of the fiber bundle set lower than a defined tension, and performing the hoop winding for a predetermined number of times such that the fiber bundles overlap, and a sixth step of performing the hoop winding with the tension of the fiber bundle set to the defined tension.

According to this example, the fiber bundle is fixed to the liner surface, and thereafter, the hoop winding is started with the tension of the fiber bundle set lower than the defined tension and the hoop winding is carried out for a predetermined number of times such that the fiber bundles overlap. The fixing portion of the fiber bundle thus can be prevented from being pulled at high tension and detaching. Furthermore, the reinforcement layer having the defined strength can be formed since the hoop winding is carried out with the tension of the fiber bundle set to the defined tension after carrying out the hoop windings for a predetermined number of times such that the fiber bundles overlap.

According to a further example of the embodiment described above, the fifth step includes performing the hoop winding such that the fiber bundles intersect.

According to this example, the fiber bundle is fixed to the liner surface, and thereafter, the hoop winding is started with the tension of the fiber bundle set lower than the defined tension, and the hoop winding is carried out such that the fiber bundles intersect. Thus, since the fiber bundle underneath is tightened and fixed by the topside fiber bundle, the fixing portion of the fiber bundle can be reliably prevented from detaching by being pulled at high tension.

Another embodiment of the present invention relates to a filament winding apparatus for winding a fiber bundle around a liner surface with a hoop winding device. The hoop winding device includes a winding section, a fixing portion, a cutter, and a control section. The winding section hoop winds the fiber bundle around the liner surface. The fixing portion fixes the fiber bundle to the liner surface. The cutter cuts the fiber bundle. The control section controls a first fixing operation by the fixing portion to fix an end of the fiber bundle to the liner surface at a starting position of the hoop winding, a winding operation by the winding section to hoop wind the fiber bundle having the end fixed to the liner surface, a second fixing operation by the fixing portion to fix the hoop-wound fiber bundle to the liner surface at an ending position of the hoop winding, and a cutting operation by the cutter to cut the fiber bundle upstream in a fiber bundle supplying direction of a position where the fiber bundle is fixed in the second fixing operation.

According to this embodiment, when starting the hoop winding, the end of the fiber bundle is fixed to the liner surface to start the hoop winding at the starting position of the hoop winding. When ending the hoop winding, the fiber bundle is fixed to the liner surface to be cut at the ending position of the hoop winding. When starting the hoop winding in such a manner, the end of the fiber bundle is fixed to the liner surface to start the hoop winding at the starting position of the hoop winding. Consequently, the easy winding and the combination winding of the fiber bundle are not necessary and the time required for the hoop winding can be shortened. Furthermore, since easy winding and combination winding of the fiber bundle are not necessary, the usage amount of the fiber bundle can be reduced and the manufacturing cost can be reduced.

According to one example of the embodiment described above, the fiber bundle includes a thermosetting resin or a thermoplastic resin; and the fixing portion brings the fiber bundle into contact with the liner surface and heats the contacting portion.

According to this example, the fiber bundle includes a thermosetting resin or a thermoplastic resin, and the fixation of the fiber bundle to the liner surface brings the fiber bundle into contact with the liner surface and heats the contacting portion. The thermosetting resin or the thermoplastic resin is thereby cured or welded, and the fiber bundle can be fixed to the liner surface.

According to another example of the embodiment described above, the fixing portion includes a heater for heating the fiber bundle, and a gripping part capable of gripping the fiber bundle both upstream and downstream in the fiber bundle supplying direction with respect to the heater. The control section controls a first gripping operation by the gripping part to grip the fiber bundle downstream in the fiber bundle supplying direction with respect to the heater in the first fixing operation, and a second gripping operation by the gripping part to grip the fiber bundle upstream in the fiber bundle supplying direction with respect to the heater in the second fixing operation.

According to this example, when starting the hoop winding, the gripping part grips the fiber bundle downstream in the fiber bundle supplying direction with respect to the heater, brings the fiber bundle into contact with the liner surface and heats the contacting portion with the heater. Consequently, the end of the fiber bundle can be fixed to the liner surface at the starting position of the hoop winding. When ending the hoop winding, the fiber bundle is gripped upstream in the fiber bundle supplying direction with respect to the heater, the fiber bundle is brought into contact with the liner surface, and the contacting portion is heated with the heater. Consequently, the fiber bundle can be fixed to the liner surface to be cut with the cutter at the ending position of the hoop winding. The starting and ending of the hoop winding are thus automated and promptly carried out, whereby the time required for the hoop winding can be shortened.

Another embodiment of the present invention relates to a filament winding method for performing a hoop winding step that includes first to sixth steps. The first step winds a fiber bundle around a holding section on an outer side in a radial direction of a liner to temporarily hold the fiber bundle. The second step moves a winding position of the fiber bundle from the holding section to the liner to start the hoop winding of the fiber bundle around the liner at a starting position of the hoop winding. The third step cuts the fiber bundle bridged from the holding section to the liner. The fourth step performs the hoop winding of the fiber bundle with respect to the liner. The fifth step moves the winding position of the fiber bundle from the liner to the holding section to wind the fiber bundle around the holding section and hold the fiber bundle at an ending position of the hoop winding. The sixth step cuts the fiber bundle bridged from the liner to the holding section.

According to this embodiment, when starting the hoop winding, the winding position of the fiber bundle is moved from the holding section to the liner to start the hoop winding of the fiber bundle around the liner at the starting position of the hoop winding. When ending the hoop winding, the winding position of the fiber bundle is moved from the liner to the holding position, and the fiber bundle is wound around the holding position to hold the fiber bundle at the ending position of the hoop winding. When starting the hoop winding in such a manner, the winding position of the fiber bundle is moved from the holding position to the liner at the starting position of the hoop winding. Consequently, easy winding and combination winding of the fiber bundle are not necessary when starting the hoop winding regardless of whether or not the fiber layer is formed on the liner, and the time required for the hoop winding can be shortened. Since easy winding and combination winding of the fiber bundle are not necessary, the usage amount of the fiber bundle can be reduced and the manufacturing cost can be reduced.

A further embodiment of the present invention relates to a filament winding apparatus for winding a fiber bundle around a liner with a hoop winding device that includes a winding section, a holding section, a cutter, and a control section. The winding section performs hoop winding of the fiber bundle with respect to the liner. The holding section can be wound around with the fiber bundle by the winding section and can temporarily hold the fiber bundle on an outer side in a radial direction of the liner. The cutter cuts the fiber bundle. The control section controls a winding starting operation, a first cutting operation, a winding operation, a retreating operation, and a second cutting operation. The winding starting operation moves a winding position of the fiber bundle from the holding section to the liner to start the hoop winding of the fiber bundle around the liner at a starting position of the hoop winding after winding the fiber bundle around the holding section. The first cutting operation cuts the fiber bundle bridged from the holding section to the liner with the cutter. The winding operation performs the hoop winding of the fiber bundle with respect to the liner. The retreating operation moves the winding position of the fiber bundle from the liner to the holding section to wind the fiber bundle around the holding section and holds the fiber bundle at an ending position of the hoop winding. The second cutting operation cuts the fiber bundle bridged from the liner to the holding section by the cutter.

According to this embodiment, when starting the hoop winding, the winding starting operation of moving the winding position of the fiber bundle from the holding section to the liner to start the hoop winding of the fiber bundle around the liner is carried out at the starting position of the hoop winding. When ending the hoop winding, the retreating operation of moving the winding position of the fiber bundle from the liner to the holding section and winding the fiber bundle around the holding section to hold the fiber bundle is carried out at the ending position of the hoop winding. When starting the hoop winding in such a manner, the winding position of the fiber bundle is moved from the holding position to the liner at the starting position of the hoop winding. Consequently, easy winding and combination winding of the fiber bundle are not necessary when starting the hoop winding regardless of whether or not the fiber layer is formed on the liner, and the time required for the hoop winding can be shortened. Since easy winding and combination winding of the fiber bundle are not necessary, the usage amount of the fiber bundle can be reduced and the manufacturing cost can be reduced.

According to an example of the embodiment described above, the control section performs control to change a relative position between the winding section and the holding section in an axial direction of the liner in the winding starting operation and the retreating operation.

According to this example, the relative position between the winding section and the holding section is changed in the axial direction of the liner in the winding starting operation and the retreating operation. Thus, the winding starting operation and the retreating operation can be carried out with fewer operations.

According to another example of the embodiment described above, the holding section is configured by a plurality of members arranged in a circumferential direction of the liner, the plurality of members being moved in the radial direction of the liner to enlarge or reduce the holding section.

According to this example, the holding section is configured by a plurality of members arranged in a circumferential direction of the liner, and the plurality of members are moved in the radial direction of the liner to enlarge or reduce the holding section. Thus, the liner of different radius can be easily employed.

According to a further example of the embodiment described above, the holding section includes a guiding section for guiding the fiber bundle from the liner to the holding section in the retreating operation.

The holding section includes the guiding section for guiding the fiber bundle from the liner to the holding section in the retreating operation. Thus, the fiber bundle can be reliably wound around the holding section in the retreating operation.

Other features, elements, processes, steps, characteristics and advantages of the invention will become more apparent from the following detailed description of embodiments of the invention with reference to the attached drawings.

DETAILED DESCRIPTION OF EMBODIMENTS OF THE INVENTION

First Embodiment

First, an overall structure of a filament winding apparatus 100 according to a first embodiment of the present invention will be described with reference to FIGS. 1-3. Hereinafter, the filament winding apparatus 100 will be referred to as the FW device 100 for short.

Figure 1:
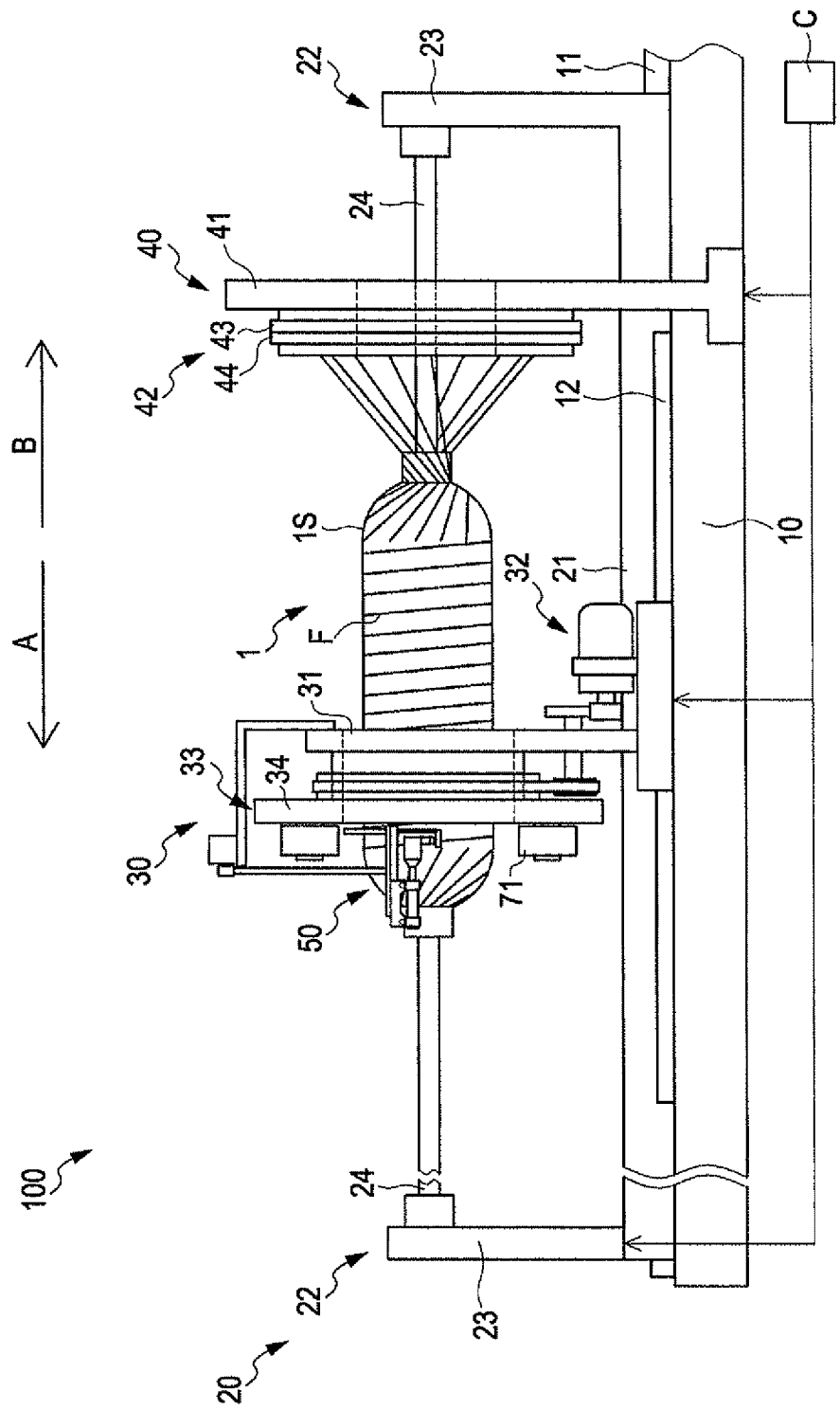
FIG. 1 is a side view of an FW device according to a first embodiment illustrating a state in which a hoop winding device is at a winding start position.
Figure 2:
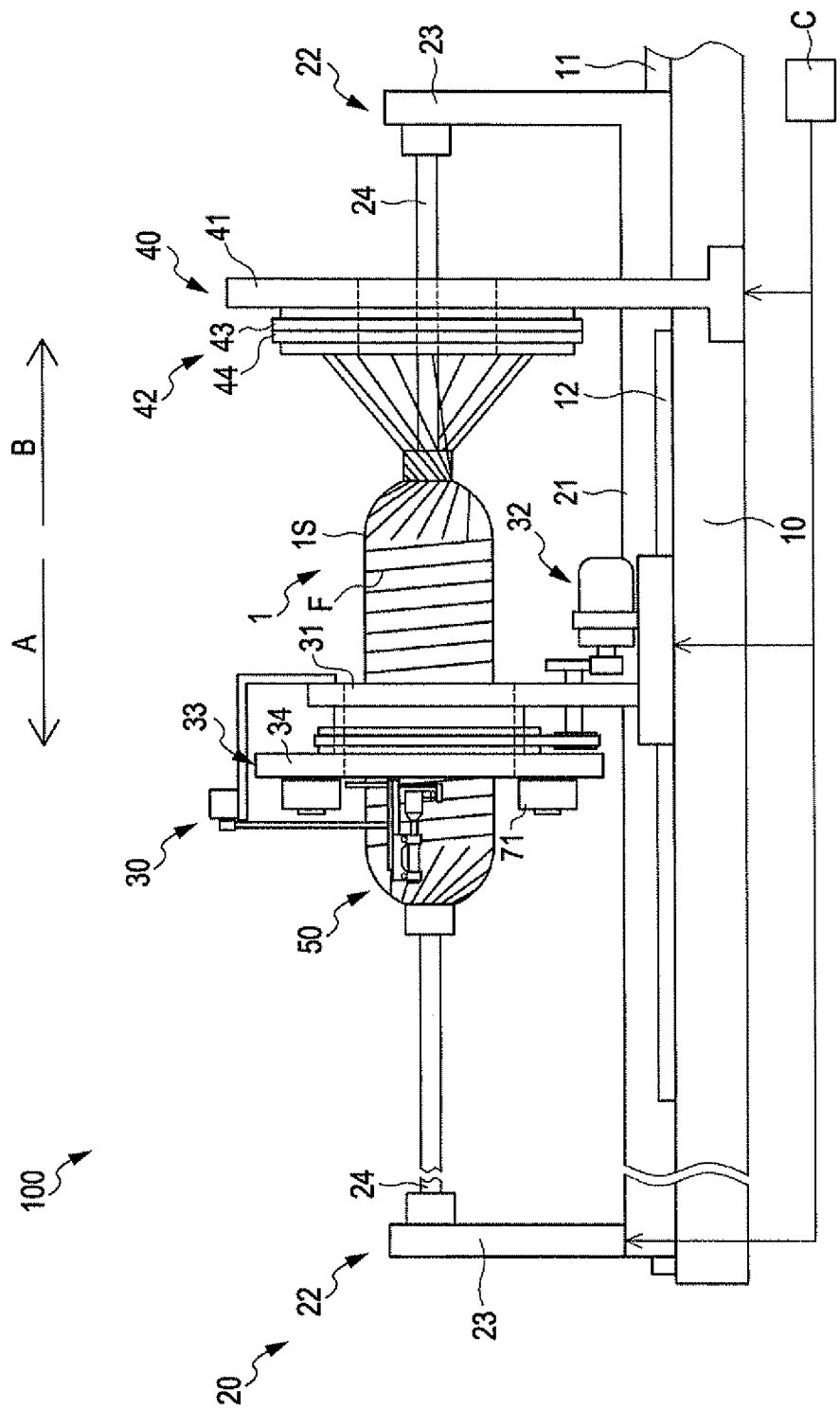
FIG. 2 is a side view of the FW device according to the first embodiment illustrating a state in which the hoop winding device is carrying out hoop winding.
Figure 3:
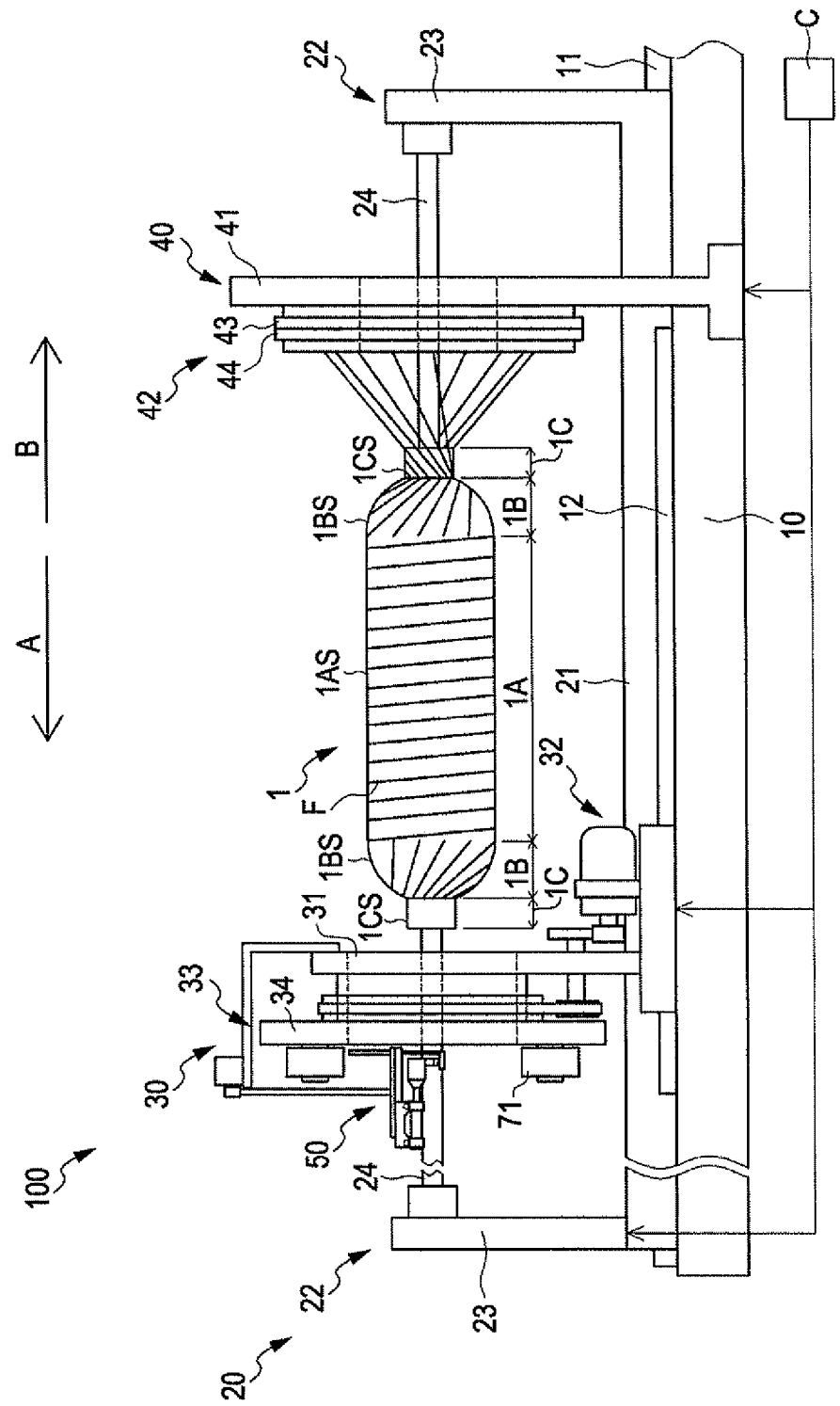
FIG. 3 is a side view of the FW device according to the first embodiment illustrating a state in which the hoop winding device is at a standby position.

FIGS. 1-3 are side views illustrating the FW device 100. FIG. 1 illustrates a state in which a hoop winding device 30 is at a winding start position. FIG. 2 illustrates a state in which the hoop winding device 30 is carrying out hoop winding. FIG. 3 illustrates a state in which the hoop winding device 30 is at a standby position. The FW device 100 winds a fiber bundle F impregnated with resin around a liner 1 by repeatedly carrying out hoop winding by the hoop winding device 30 and helical winding by a helical winding device 40 alternately with respect to the liner 1.

Arrows A, B illustrated in FIG. 1 indicate a front-back direction of the FW device 100, and a transfer direction of the liner 1 in the helical winding. In the helical winding, the liner 1 reciprocates in the front-back direction of the FW device 100, and hence the liner 1 may be transferred in the direction of the arrow A or may be transferred in the direction of the arrow B.

The liner 1 is a substantially cylindrical hollow container made of a high strength aluminum material, polyamide resin, or the like, for example. A pressure resistance property of the liner 1 is improved by winding a fiber bundler F around an outer circumferential surface 1S of the liner 1. That is, the liner 1 becomes a base material that constitutes a pressure resistant container. In the following description, the liner 1 refers to both a state before winding the fiber bundle F and a state in the middle of winding the fiber bundle F. For example, the outer circumferential surface 1S of the liner 1 also refers to a surface of the wound fiber bundle F.

The FW device 100 is mainly configured by a main base 10, a liner transfer device 20, the hoop winding device 30, a helical winding device 40, and a control section C. The main base 10 configures the basis of the FW device 100. A liner transfer device rail 11 is arranged at an upper part of the main base 10. The liner transfer device 20 is mounted on the liner transfer device rail 11. A hoop winding device rail 12 is arranged parallel to the liner transfer device rail 11 at the upper part of the main base 10. The hoop winding device 30 is mounted on the hoop winding device rail 12. According to this structure, the liner transfer device 20 and the hoop winding device 30 can be moved with respect to the main base 10. The helical winding device 40 is fixed to the main base 10.

The liner transfer device 20 rotates the liner 1 with a rotation axis in a direction along the front-back direction of the FW device 100 as a center, and transfers the liner 1 in the front-back direction of the FW device 100. The liner transfer device 20 is mainly configured by a base 21 and liner supporting sections 22. The driving of the liner transfer device 20 is controlled by the control section C.

The base 21 supports a pair of liner supporting sections 22. Each of the liner supporting sections 22 includes a liner supporting frame 23 and a supporting shaft 24. The liner supporting frame 23 extends from the base 21 towards an upper side. The supporting shaft 24 extends from the liner supporting frame 23 along the front-back direction of the FW device. The supporting shaft 24 is rotated in one direction about an axis by a power mechanism. The supporting shaft 24 supports both ends of the liner 1, and rotates the liner 1. According to this structure, the liner transfer device 20 rotates the liner 1 with the supporting shaft 24 as a rotation axis, and transfers the liner 1 in the front-back direction of the FW device 100.

The hoop winding device 30 is a device for hoop winding the fiber bundle F around the outer circumferential surface 1S of the liner 1. In the hoop winding, the fiber bundle F is wound around the outer circumferential surface 1S of the liner 1 such that a winding angle of the fiber bundle F with respect to a center axis of the liner 1 becomes approximately 90 degrees. The hoop winding device 30 is mainly configured by a base 31, a power mechanism 32, a hoop winding unit 33, and a fiber bundle processing device 50. The driving of the hoop winding device 30 is controlled by the control section C.

The power mechanism 32 and the hoop winding unit 33 are arranged on the base 31. The hoop winding unit 33 includes a winding table 34 and bobbins 71 (71A, 71B, 71C, 71D) (see FIG. 5). The winding table 34 includes a space where the liner 1 is inserted at the center. The bobbins 71 (71A, 71B, 71C, 71D) are arranged on the winding table 34 to supply the fiber bundle F to the outer circumferential surface 1S of the liner 1. The power mechanism 32 rotates the hoop winding unit 33 about the center axis of the liner 1.

In the hoop winding, the position of the liner 1 is fixed, and the hoop winding unit 33 is rotated about the center axis of the liner 1 while causing the hoop winding device 30 to reciprocate along the center axis direction of the liner 1. The hoop winding is thereby carried out. The winding mode of the fiber bundle F can be freely changed by adjusting a movement speed of the hoop winding device 30 and a rotation speed of the winding table 34. The fiber bundle processing device 50 will be specifically described later.

The helical winding device 40 is a device for helical winding the fiber bundle F around the outer circumferential surface 1S of the liner 1. In the helical winding, the fiber bundle F is wound around the outer circumferential surface 1S of the liner 1 such that the winding angle of the fiber bundle F becomes a predetermined value (e.g., 0 to 60 degrees). The helical winding device 40 is mainly configured by a base 41 and a helical winding unit 42. The driving of the helical winding device 40 is controlled by the control section C.

The helical winding unit 42 is arranged on the base 41. The helical winding unit 42 includes a first helical head 43 and a second helical head 44. The fiber bundle F is supplied from a plurality of bobbins to the first helical head 43 and the second helical head 44, and the fiber bundle F is guided to the outer circumferential surface 1S of the liner 1.

In the helical winding, the helical winding device 40 is fixed, and the liner 1 is transferred in the rotation axis direction while being rotated by the liner transfer device 20. The helical winding is thereby carried out. The winding mode of the fiber bundle F can be freely changed by adjusting the transfer speed and the rotation speed of the liner 1.

Figure 4:
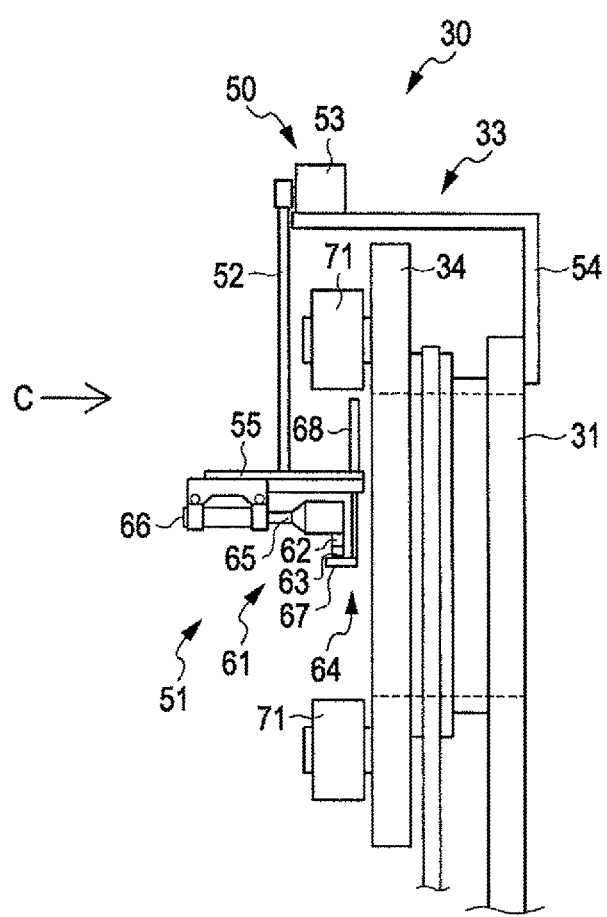
FIG. 4 is a side view of the hoop winding device.

The fiber bundle processing device 50 of the hoop winding device 30, which is a characteristic portion of the present invention, is now described. FIG. 4 is a side view of the hoop winding device 30, and FIG. 5 is a front view of a hoop winding device 30 seen from a direction of an arrow C of FIG. 4.

First, the hoop winding device 30 will be specifically described. As illustrated in FIGS. 4 and 5, the bobbins 71 (71A, 71B, 71C, 71D), a fiber supply guide 72, and a guide roller 73 are arranged on the winding table 34 of the hoop winding device 30. The bobbins 71 (71A, 71B, 71C, 71D) are arranged at equal intervals around the liner 1, which is inserted to the winding table 34, and supply the fiber bundle F to the liner 1. The guide roller 73 gathers four fiber bundles F from the bobbins 71A, 71B, 71C, 71D and guides the same to the fiber supply guide 72. The fiber supply guide 72 supplies four fiber bundles F gathered by the guide roller 73 to the outer circumferential surface 1S of the liner 1.

Figure 5:
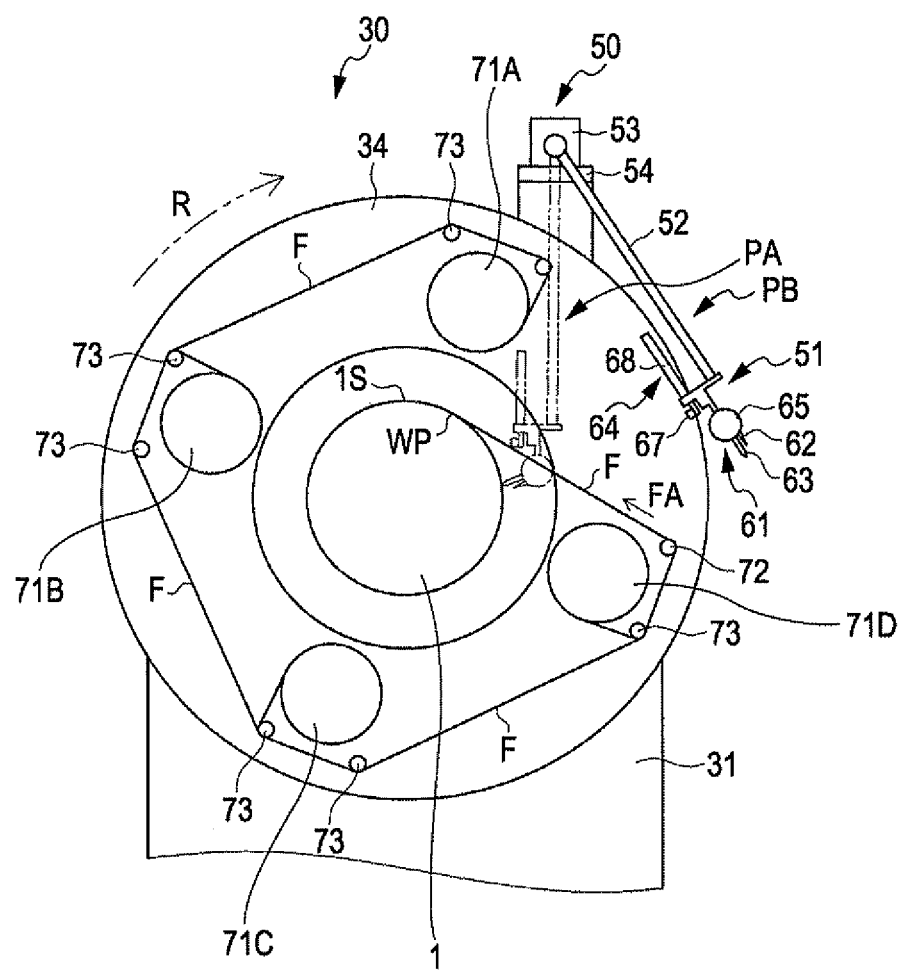
FIG. 5 is a front view of the hoop winding device seen from a direction of an arrow C in FIG. 4.

The winding table 34 is rotated in a direction of an arrow R in FIG. 5 by the power mechanism 32. The fiber bundle F guided from the fiber supply guide 72 to the liner 1 is wound around the outer circumferential surface 1S of the liner 1 while being rotated in the direction of the arrow R. The fiber bundle F is supplied in the direction of an arrow FA, which is the downstream side in the rotating direction of the winding table 34. The direction FA in which the fiber bundle F is supplied is hereinafter referred to as a fiber supplying direction FA. A base end side of the arrow FA is the upstream side in the fiber supplying direction FA, and a leading end side of the arrow FA is the downstream side in the fiber supplying direction FA. A position where the fiber bundle F guided from the fiber supply guide 72 to the liner 1 is brought into contact and wound around the outer circumferential surface 1S of the liner 1 is referred to as a winding position WP.

The power mechanism 32 for driving the winding table 34 is connected to the control section C, where the rotation and stop are controlled based on a signal from the control section C. A detecting section that detects the rotation angle of the winding table 34 and detects the position of the winding table 34 is connected to the control section C. An encoder, for example, is used for the detecting section. The control section C detects the position of the winding table 34 to specify the position of the bobbins 71 (71A, 71B, 71C, 71D), the winding position WP of the fiber bundle F, and the like. The control section C controls the power mechanism 32 while detecting the position of the winding table 34 to stop the rotation of the winding table 34 such that the fiber supply guide 72 and the winding position WP of the fiber bundle F come to an arbitrary position.

Next, the fiber bundle processing device 50 will be described. As illustrated in FIGS. 4 and 5, the fiber bundle processing device 50 mainly includes a processing section 51, an arm 52, and a driving section 53. The fiber bundle processing device 50 is arranged on the side where the winding of the fiber bundle F is carried out in the winding table 34, that is, on the same side as the bobbins 71 (71A, 71B, 71C, 71D), the fiber supply guide 72, and the like. The fiber bundle processing device 50 is connected to the control section C, and drives the processing section 51 and the driving section 53 based on the signal from the control section C. A supporting section 54 supports the fiber bundle processing device 50, and is fixed to the base 31.

The processing section 51 performs an operation of fixing the fiber bundle F supplied from the fiber supply guide 72 of the winding table 34 to the outer circumferential surface 1S of the liner 1 at the start and at the end of the hoop winding. The processing section 51 includes a processing section main body 55, a fixing portion 61, and a cutter 62.

The fixing portion 61 and the cutter 62 are supported by the processing section main body 55. The arm 52 supports the processing section 51, and a first end is fixed to the processing section main body 55 and a second end is fixed to the driving section 53. The driving section 53 swings the arm 52 and the processing section 51. A motor serving as a drive source and a gear for transmitting the driving force of the motor to the arm 52 are arranged. The driving section 53 is mounted on the supporting section 54. As illustrated in FIG. 5, the driving section 53 swings the arm 52 based on a control signal from the control section C to switch the position of the processing section 51 between an activated position PA and a retreated position PB.

The activated position PA of the processing section 51 is a position where the processing section 51 performs the operation of fixing the fiber bundle F to the outer circumferential surface 1S of the liner 1 at the start and at the end of the hoop winding. The retreated position PB of the processing section 51 is a position where the processing section 51 and the arm 52 do not interfere with the rotating winding table 34, the bobbins 71 (71A, 71B, 71C, 71D), the fiber bundle F, and the like when hoop winding the fiber bundle F around the outer circumferential surface 1S of the liner 1.

The fixing portion 61 includes a heater 63 and a gripping part 64. The heater 63 includes heating means. The heater 63 makes contact with the fiber bundle F supplied from the fiber supply guide 72 of the winding table 34 to heat the thermosetting resin or the thermoplastic resin impregnated in the fiber bundle F. Consequently, the resin is cured or welded in a short time to fix the fiber bundle F to the outer circumferential surface 1S of the liner 1. In the present embodiment, the thermosetting resin is used for the resin impregnated in the fiber bundle F. The heater 63 is arranged in a fixing portion main body 65. The fixing portion main body 65 is connected to a motor 66 serving as a drive source. The motor 66 is mounted to the processing section main body 55. The heater 63 is swung by a predetermined angle by the driving of the motor 66 based on the signal of the control section C (see FIG. 6 to FIG. 11).

The heating means arranged in the heater 63 may be known heating means such as resistance heating, induction heating and the like. The thermosetting resin or the thermoplastic resin to be impregnated in the fiber bundle F may be impregnated after the fiber bundle F is supplied from the bobbins 71 (71A, 71B, 71C, 71D) and before the fiber bundle F is wound around the liner 1. Alternatively, a prepreg in which the thermosetting resin or the thermoplastic resin is impregnated in advance may be used. Furthermore, the resin for fixing the fiber bundle F to the outer circumferential surface 1S of the liner 1 may be partially impregnated.

The gripping part 64 grips the fiber bundle F when fixing the fiber bundle F to the outer circumferential surface 1S of the liner 1. The gripping part 64 includes a chucker 67 and a moving section 68. The chucker 67 includes an open/close port, and approaches the fiber bundle F supplied from the fiber supply guide 72 of the winding table 34 with the open/close port greatly opened. When the fiber bundle F is caught inside the open/close port, the fiber bundle F is gripped by closing the open/close port.

The moving section 68 switches the position of the chucker 67 with respect to the heater 63. The moving section 68 is, for example, an air cylinder, and fixes the chucker 67 to a leading end of an extensible rod. The moving section 68 is mounted to the processing section main body 55. The position of the chucker 67 is switched to downstream (see FIG. 6) and upstream (see FIG. 8) in the fiber bundle supplying direction FA with respect to the heater 63 by the moving section 68. The chucker 67 can grip the fiber bundle F at any position.

The cutter 62 cuts the fiber bundle F supplied from the fiber supply guide 72 of the winding table 34. The cutter 62 is arranged to move forward and backward with respect to the fixing portion main body 65. When cutting the fiber bundle F, the cutter 62 projects out with respect to the fixing portion main body 65 to cut the fiber bundle F. In standby, the cutter 62 is retracted into the fixing portion main body 65 and retreats to a position not making contact with the fiber bundle F.

A positional relationship between the winding table 34 and the fiber bundle processing device 50 will now be described. In the positional relationship between the winding table 34 and the fiber bundle processing device 50 illustrated in FIG. 5, the position of the processing section 51 is switched between the activated position PA and the retreated position PB. The position is switched between the activated position PA and the retreated position PB while the winding table 34 is stopped at the start and at the end of the hoop winding. However, even when the winding table 34 is stopped, if the position (rotation position) of the winding table 34 differs from the position (rotation position) illustrated in FIG. 5, the winding table 34 may interfere with the bobbins 71A, 71B, 71C, 71D, the fiber supply guide 72, the guide roller 73, and the fiber bundle F wound therearound. The processing section 51 is also required to perform the operation of gripping the fiber bundle F supplied from the fiber supply guide 72 of the winding table 34, and fixing the fiber bundle F to the outer circumferential surface 1S of the liner 1.

Thus, in the present embodiment, while the position of the processing section 51 is switched between the activated position PA and the retreated position PB and while the processing section 51 is positioned at the activated position PA, the position (rotation position) of the winding table 34 is maintained such that the processing section 51 is positioned between the bobbin 71A and the bobbin 71D, as illustrated in FIG. 5. This position (rotation position) of the winding table 34 is hereinafter referred to as a processing stop position.

Next, the operation of the fiber bundle processing device 50 in the hoop winding of the FW device 100 having the above structure will be described. The liner 1 used in the present embodiment includes a first tubular portion 1A having a prescribed radius, a dome portion 1B arranged at both ends of the tubular portion 1A, and a second tubular portion 1C arranged at the end of the dome portion 1B (see FIG. 3). The liner 1 is mounted to the liner transfer device 20, and the hoop winding is performed following the helical winding performed previously. Thereafter, the helical winding is performed again. The winding conditions of the hoop winding, that is, the winding conditions such as the movement speed of the hoop winding device 30, the rotation speed of the winding table 34, the number of times to reciprocate the hoop winding device 30, and the movement distance of the hoop winding device 30 are input to the control section C in advance by the operator. The control section C controls the driving of the hoop winding device 30 in the following manner based on the input winding conditions.

After the helical winding before the hoop winding is finished, the hoop winding device 30 is moved along the front-back direction of the FW device 100 from the standby position (see FIG. 3) to move to the position to start the hoop winding, as illustrated in FIG. 1. In the present embodiment, the hoop winding is assumed to start from one end of the tubular portion 1A of the liner 1. When the hoop winding device 30 is moved, the winding table 34 is at the processing stop position, and the processing section 51 is at the retreated position PB (see FIG. 11). The chucker 67 grips the fiber bundle F supplied from the fiber supply guide 72 of the winding table 34.

Figure 6:
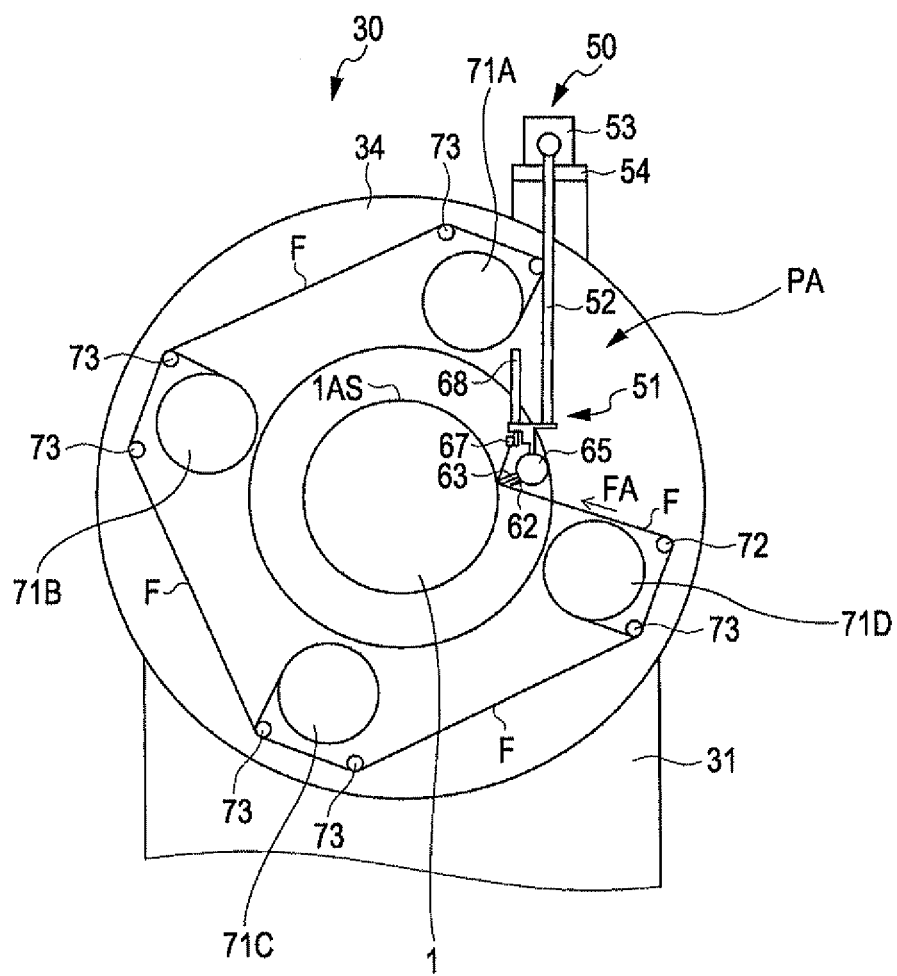
FIG. 6 is a view illustrating an operation of fixing an end of the fiber bundle to an outer circumferential surface of the liner at a starting position of the hoop winding.

As illustrated in FIG. 1, when the hoop winding device 30 reaches the position to start the hoop winding, as illustrated in FIG. 6, the processing section 51 is moved to the activated position PA by the swinging of the arm 52. The position of the chucker 67 is downstream in the fiber bundle supplying direction FA with respect to the heater 63. The heater 63 is directed towards an outer circumferential surface 1AS of the tubular portion 1A by the swinging of the fixing portion main body 65. The heater 63 brings the fiber bundle F into contact with the outer circumferential surface 1AS of the tubular portion 1A and heats the contacting portion, whereby the thermosetting resin impregnated in the fiber bundle F is cured and the end of the fiber bundle F is fixed to the fiber bundle F wound in the helical winding. The cutter 62 is retracted to the fixing portion main body 65, and is retreated to the position not making contact with the fiber bundle F.

Figure 7:
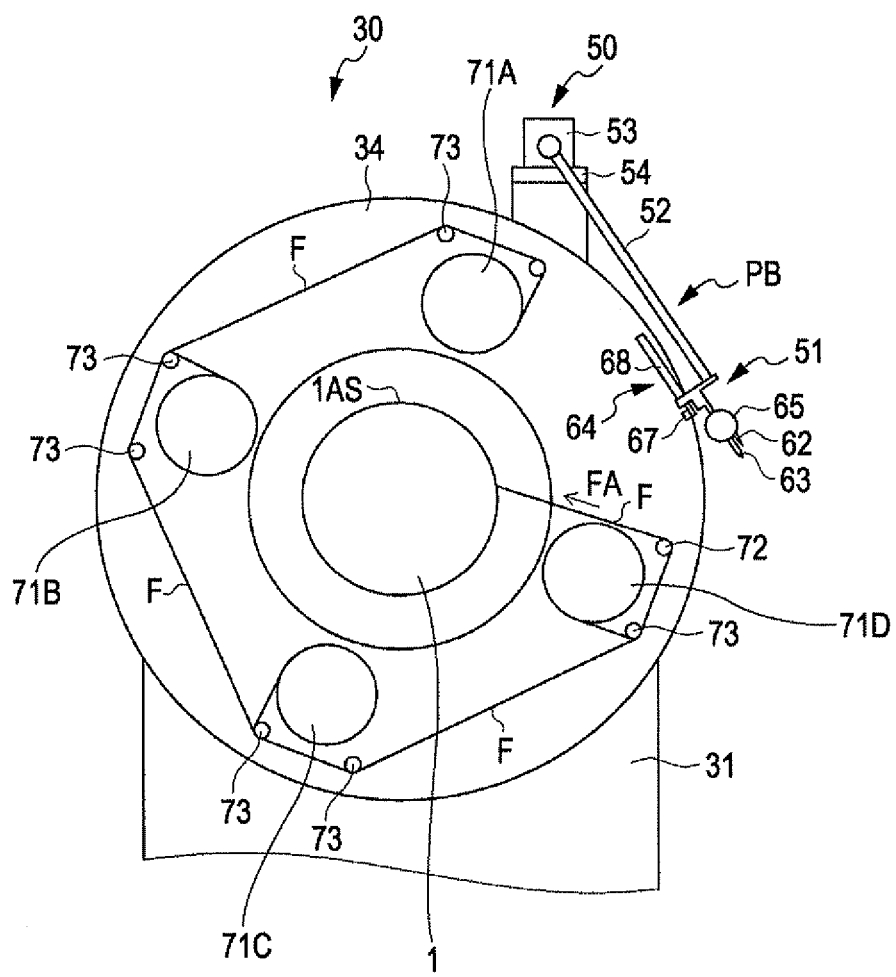
FIG. 7 is a view illustrating a state in which a processing section is moved to a retreated position.

As illustrated in FIG. 7, when the end of the fiber bundle F is fixed to the outer circumferential surface 1AS of the tubular portion 1A, the processing section 51 is moved to the retreated position PB by the swinging of the arm 52. When the processing section 51 is moved to the retreated position PB, the hoop winding device 30 starts the winding of the fiber bundle F. For the first few windings, a tension of the fiber bundle F is set lower than a defined tension, and in this state, the subsequent fiber bundle F is wound so as to overlap the fiber bundle F wound underneath. Alternatively, the subsequent fiber bundle F is wound so as to intersect the fiber bundle F wound underneath. After winding the first few windings, the tension of the fiber bundle F is set to the defined tension and the hoop winding is carried out.

As illustrated in FIG. 2, the fiber bundle F is hoop wound around the outer circumferential surface 1AS of the tubular portion 1A by moving the hoop winding device 30 in the right direction in the figure while rotating the winding table 34. A first hoop winding layer is formed in this state. Thereafter, the hoop winding device 30 is inverted and moved to form a second hoop winding layer on the outer surface of the previous hoop winding layer. When further forming the hoop winding layer, the hoop winding is carried out for a required number of times by reciprocating the hoop winding device 30.

Figure 8:
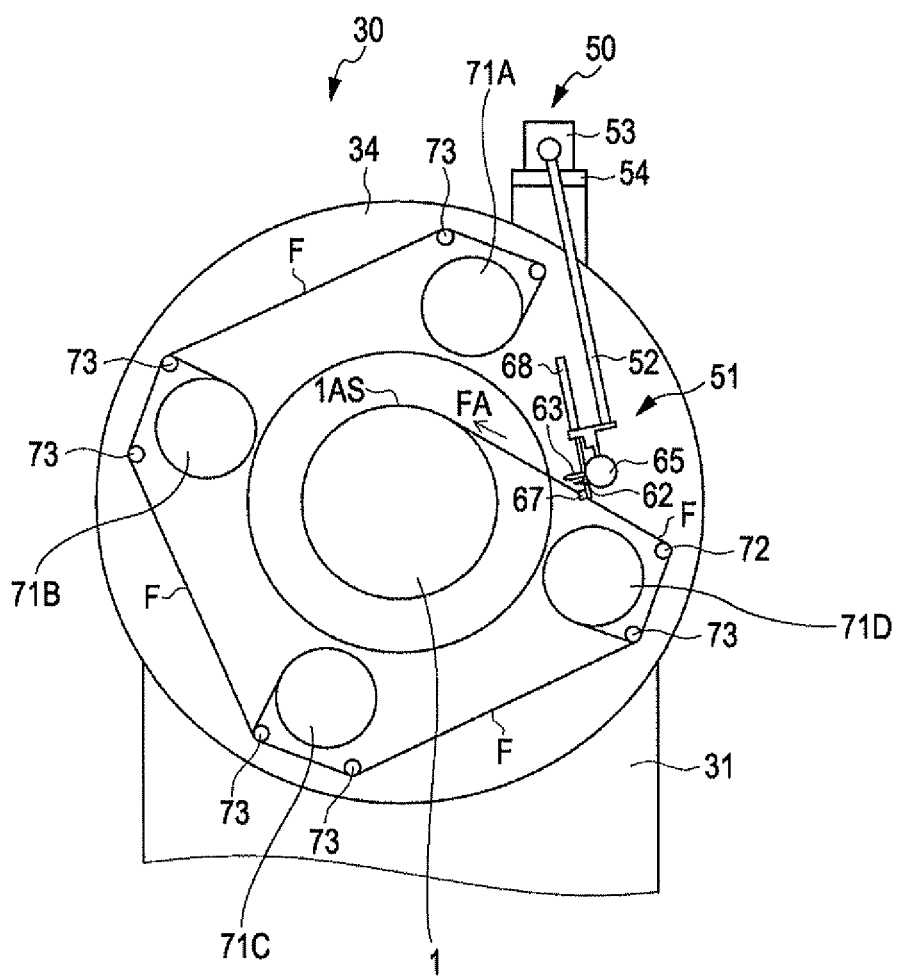
FIG. 8 is a view illustrating a gripping operation of gripping the fiber bundle upstream in a fiber bundle supplying direction with respect to a heater.

After the hoop winding of the required number of times is finished, the winding table 34 is stopped at the processing stop position, as illustrated in FIG. 8. The processing section 51 is moved from the retreated position PB towards the activated position PA. The chucker 67 is located upstream in the fiber bundle supplying direction FA with respect to the heater 63. The chucker 67 is brought close to the fiber bundle F supplied from the fiber supply guide 72 of the winding table 34 with the open/close port greatly being opened, and grips the fiber bundle F by closing the open/close port when the fiber bundle F is caught inside the open/close port. The heater 63 is directed towards the outer circumferential surface 1AS of the tubular portion 1A by the swinging of the fixing portion main body 65 so as not to come into contact with the fiber bundle F. The cutter 62 is retracted into the fixing portion main body 65 and retreats to the position not making contact with the fiber bundle F.

Figure 9:
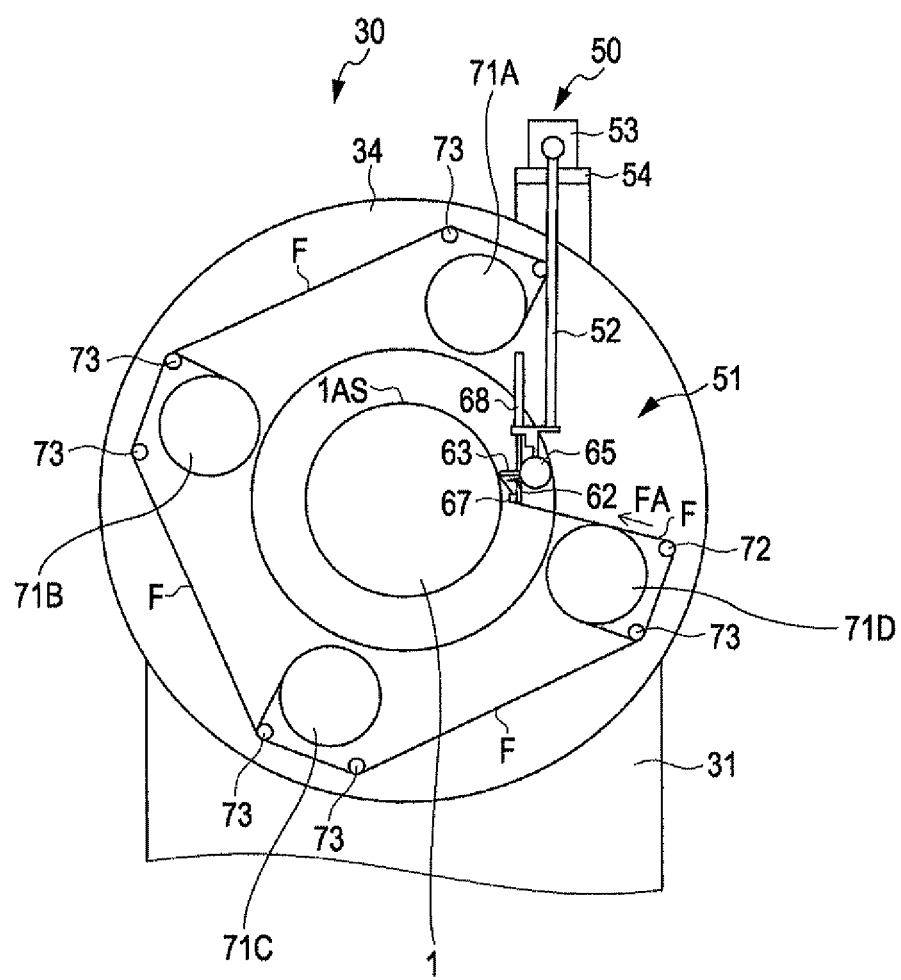
FIG. 9 is a view illustrating a fixing operation of fixing the hoop-wound fiber bundle to the outer circumferential surface of the liner at an ending position of the hoop winding.

In FIG. 8, the chucker 67 grips the fiber bundle F, and thereafter as illustrated in FIG. 9, the processing section 51 is moved to the activated position PA. Similarly to FIG. 8, the chucker 67 is located upstream in the fiber bundle supplying direction FA with respect to the heater 63. The heater 63 is also directed towards the outer circumferential surface 1AS of the tubular portion 1A. The heater 63 brings the fiber bundle F into contact with the outer circumferential surface 1AS of the tubular portion 1A and heats the contacting portion, whereby the thermosetting resin impregnated in the fiber bundle F is cured and to fix the fiber bundle F to the fiber bundle F previously wound in the hoop winding. The cutter 62 is still retracted into the fixing portion main body 65 and retreats to the position not making contact with the fiber bundle F.

Figure 10:
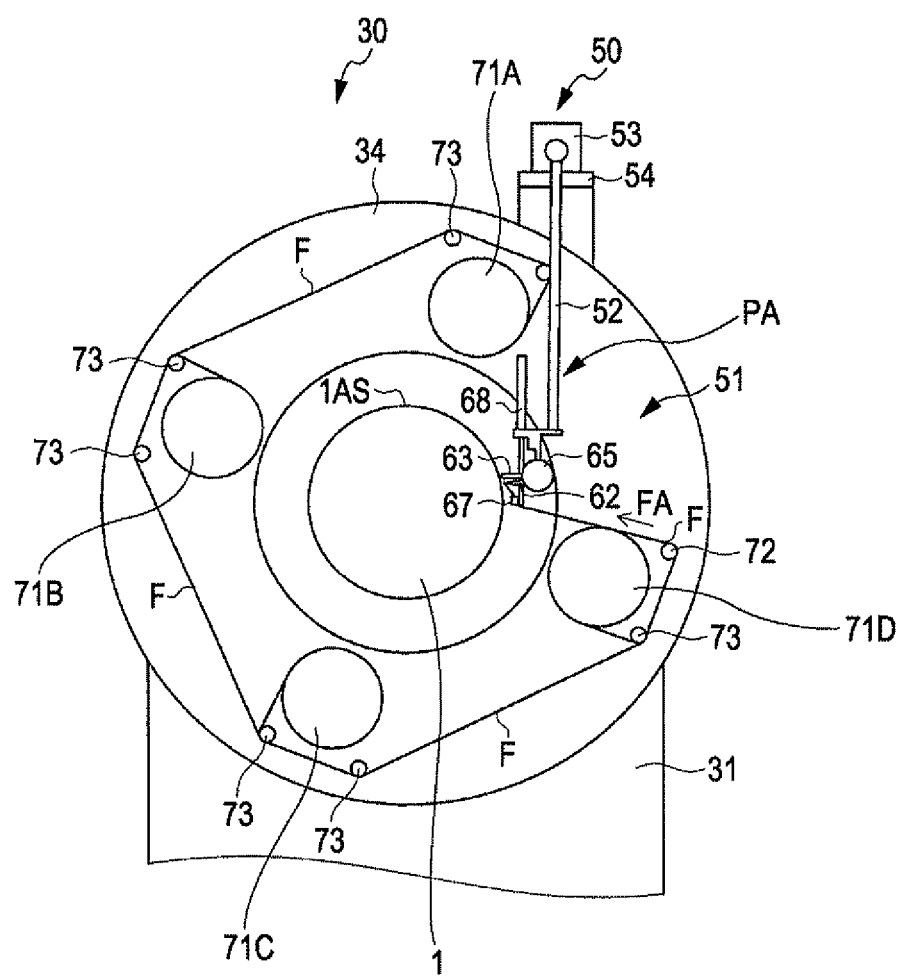
FIG. 10 is a view illustrating a cutting operation of cutting the fiber bundle upstream in the fiber bundle supplying direction of the position where the fiber bundle is fixed.

As illustrated in FIG. 10, when the fiber bundle F is fixed to the fiber bundle F previously wound in the hoop winding by the heater 63, the cutter 62 projects out with respect to the fixing portion main body 65 and cuts the fiber bundle F upstream in the fiber bundle supplying direction FA of the position (fixed position) where the fiber bundle F is fixed. The hoop-wound fiber bundle F is thereby fixed to the outer circumferential surface 1AS of the tubular portion 1A at an ending position of the hoop winding.

Figure 11:
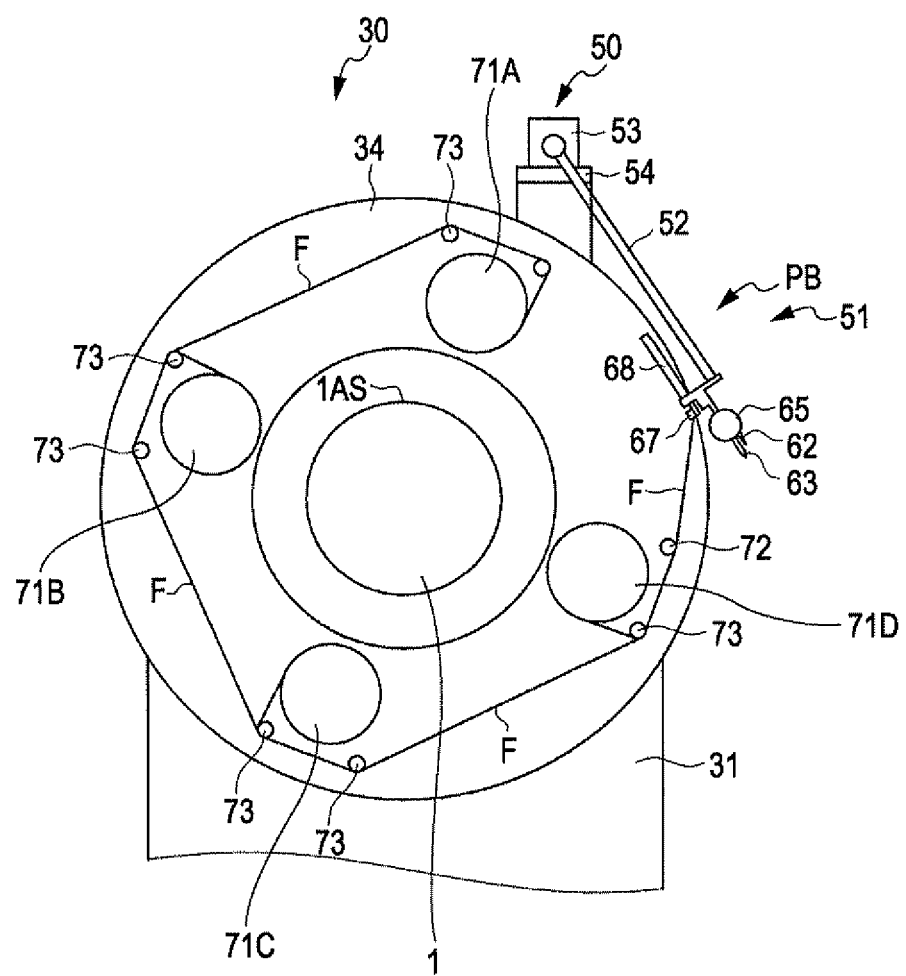
FIG. 11 is a view illustrating a state in which the processing section is moved to the retreated position.

In FIG. 10, when the cutter 62 cuts the fiber bundle F, the processing section 51 is moved from the activated position PA towards the retreated position PB, as illustrated in FIG. 11. The chucker 67 grips the fiber bundle F supplied from the fiber supply guide 72 of the winding table 34. As illustrated in FIG. 3, the hoop winding device 30 is moved along the front-back direction of the FW device 100 from the position where the hoop winding is finished and is moved to the standby position. The hoop winding device 30 waits at this position until the next helical winding is finished. Then, if the hoop winding is to be again carried out, the next hoop winding is carried out from the state illustrated in FIGS. 1 and 6.

The FW device 100 according to the embodiment described above has the following effects.

When starting the hoop winding, the end of the fiber bundle F is fixed to the outer circumferential surface 1S of the liner 1 to start the hoop winding at the starting position of the hoop winding. When ending the hoop winding, the fiber bundle F is fixed to the outer circumferential surface 1S of the liner 1 and cut at the ending position of the hoop winding. Thus, the fiber bundle F is fixed to the outer circumferential surface 1S of the liner 1 only when performing the hoop winding such that the hoop-wound fiber bundle F does not obstruct the helical winding device 40 when performing the helical winding. Consequently, the hoop winding and the helical winding can be continuously carried out alternately. When starting the hoop winding, since the end of the fiber bundle F is fixed to the outer circumferential surface 1S of the liner 1 to start the hoop winding at the starting position of the hoop winding, easy winding and combination winding of the fiber bundle F are not necessary and the time required for the hoop winding can be shortened. Furthermore, since easy winding and combination winding of the fiber bundle F are not necessary, the usage amount of the fiber bundle F can be reduced and the manufacturing cost can be reduced.

The fiber bundle F contains the thermosetting resin, where the fixation of the fiber bundle F to the outer circumferential surface 1S of the liner 1 brings the fiber bundle F into contact with the outer circumferential surface 1S of the liner 1 and heats the contacting portion. The thermosetting resin is thus cured and the fiber bundle can be fixed to the outer circumferential surface 1S of the liner 1.

After fixing the fiber bundle F to the outer circumferential surface 1S of the liner 1, the hoop winding is started with the tension of the fiber bundle F set lower than the defined tension, and the hoop winding is carried out for a predetermined number of winding such that the fiber bundles F overlap. The fixing portion of the fiber bundle F is thereby prevented from detaching by being pulled at high tension. Further, since the hoop winding is carried out with the tension of the fiber bundle F set to the defined tension after performing the hoop winding for a predetermined number of times such that the fiber bundles F overlap, a reinforcement layer having a defined strength can be formed.

After fixing the fiber bundle F to the outer circumferential surface 1S of the liner 1, the hoop winding is started with the tension of the fiber bundle F set lower than the defined tension, and the hoop winding is carried out such that the fiber bundles F intersect. Since the fiber bundle F wound underneath is tightened and fixed by the fiber bundle F wound above, the fixing portion of the fiber bundle F is reliably prevented from detaching by being pulled at high tension.

When starting the hoop winding, the gripping part 64 grips the fiber bundle F downstream in the fiber supplying direction FA with respect to the heater 63, brings the fiber bundle F into contact with the outer circumferential surface 1S of the liner 1 and heats the contacting portion with the heater 63. Consequently, the end of the fiber bundle F can be fixed to the outer circumferential surface 1S of the liner 1 at the starting position of the hoop winding. When ending the hoop winding, the fiber bundle F is gripped upstream in the fiber bundle supplying direction FA with respect to the heater 63, the fiber F is brought into contact with the outer circumferential surface 1S of the liner 1, and the contacting portion is heated with the heater 63. Consequently, the fiber bundle F can be fixed to the outer circumferential surface 1S of the liner 1 and the fiber F can be cut by the cutter 62 at the ending position of the hoop winding. Since the start and the end of the hoop winding are automated and promptly carried out, the time required for the hoop winding can be shortened.

The first embodiment of the present invention has been described above, but the present invention is not limited to this embodiment and various modifications can be made. For example, the positional relationship between the winding table 34 and the fiber bundle processing device 50 is not limited to the positional relationship illustrated in FIG. 5, and merely needs to be a positional relationship in which the winding table 34 and the fiber bundle processing device 50 do not interfere and the fiber bundle F supplied from the fiber supply guide 72 of the winding table 34 can be gripped. Different positional relationships are realized if the structure and the arrangement of the winding table 34 and the fiber bundle processing device 50 are different.

In the present embodiment, the gripping part 64 is moved with respect to the heater 63, but the heater 63 may be moved with respect to the gripping part 64.

In the present embodiment, the FW device 100 including the hoop winding device 30 and the helical winding device 40 has been described, but the present invention may be applied to an FW device dedicated to hoop winding.

Second Embodiment

An overall structure of a filament winding apparatus 1001 according to a second embodiment of the present invention will be described with reference to FIG. 12. Hereinafter, the filament winding apparatus 1001 will be referred to as the FW device 1001 for short. The same reference numerals are denoted on portions where effects, functions, and structures are common with the first embodiment, and the description thereof may be omitted.

Figure 12:
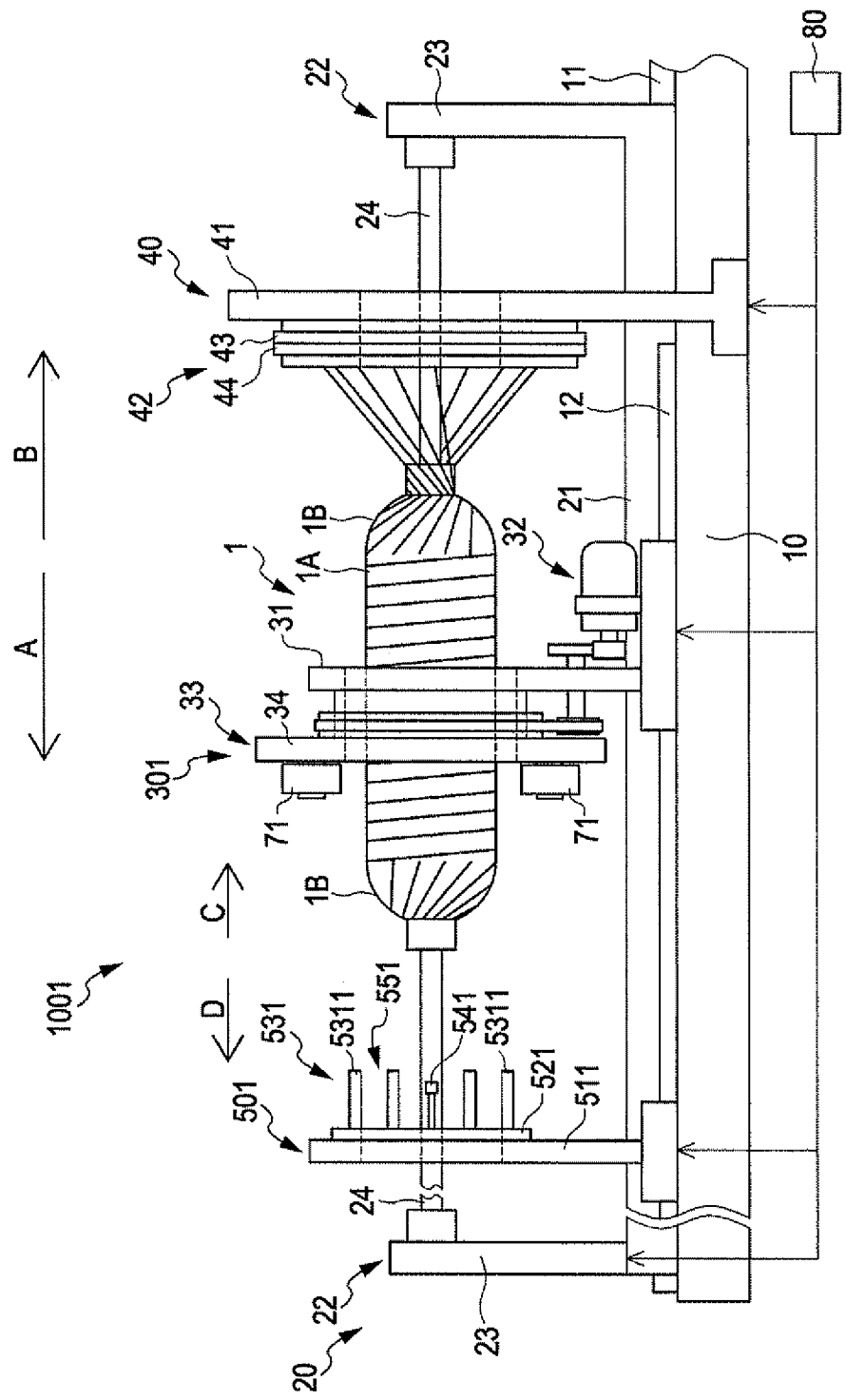
FIG. 12 is a side view of an FW device according to a second embodiment.

FIG. 12 is a side view illustrating the FW device 1001. The FW device 1001 winds the fiber bundle F impregnated with resin around the liner 1 by repeatedly carrying out hoop winding by a hoop winding device 301 and helical winding by the helical winding device 40 on the liner 1 alternately.

The hoop winding device 301 is mainly configured by the base 31, the power mechanism 32, the hoop winding unit 33, and a yarn hooking device 501. The driving of the hoop winding device 301 is controlled by a control section 80.

Figure 13:
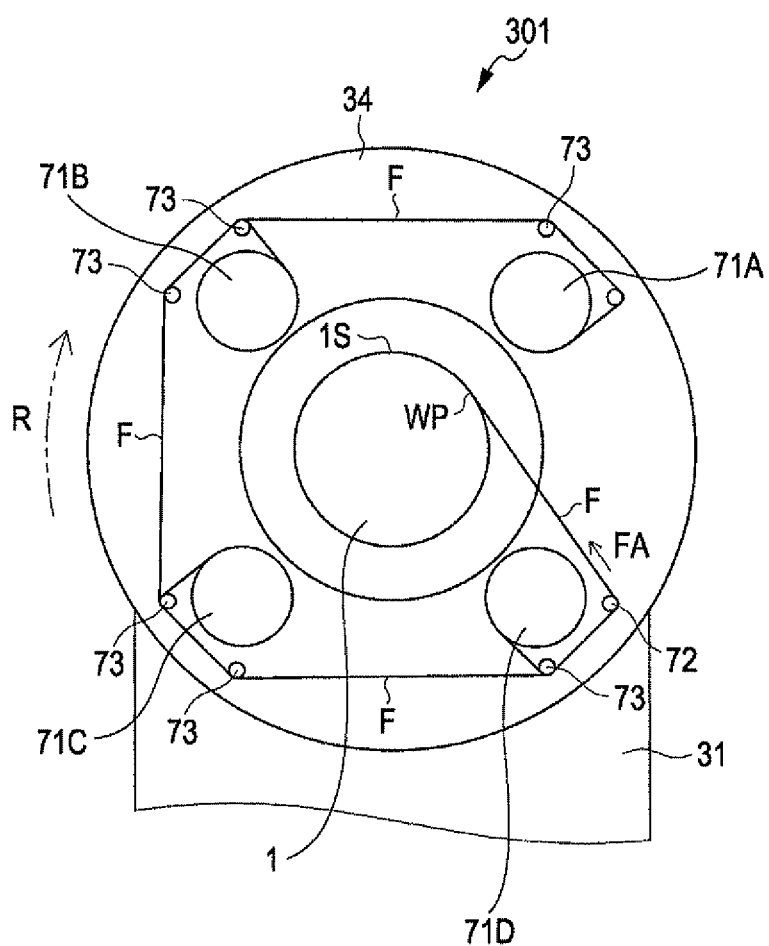
FIG. 13 is a front view of a winding table of a hoop winding device seen from a direction of an arrow C in FIG. 12.

The winding table 34 is rotated in a direction of an arrow R in FIG. 13 by the power mechanism 32. The fiber bundle F guided from the fiber supply guide 72 to the liner 1 is supplied in the direction of the arrow FA, which is the downstream side in the rotating direction of the winding table 34, while being rotated in the direction of the arrow R, and wound around the liner 1 or a holding section 531 of the yarn hooking device 501 to be described later. The position where the fiber bundle F supplied from the fiber supply guide 72 makes contact with and is wound around the liner 1 or the holding section 531 of the yarn hooking device 501 is referred to as a winding position WP.

The power mechanism 32 for driving the winding table 34 is connected to the control section 80, and the rotation and stop are controlled based on a signal from the control section 80. A detecting section detects the rotation angle of the winding table 34 and detects the position of the winding table 34 is connected to the control section 80. An encoder, for example, is used for the detecting section. The control section 80 detects the position of the winding table 34 to specify the position of the bobbins 71 (71A, 71B, 71C, 71D), the winding position WP of the fiber bundle F, and the like. The control section 80 controls the power mechanism 32 while detecting the position of the winding table 34 to stop the rotation of the winding table 34 such that the fiber supply guide 72 and the winding position WP of the fiber bundle F come to an arbitrary position.

Figure 14:
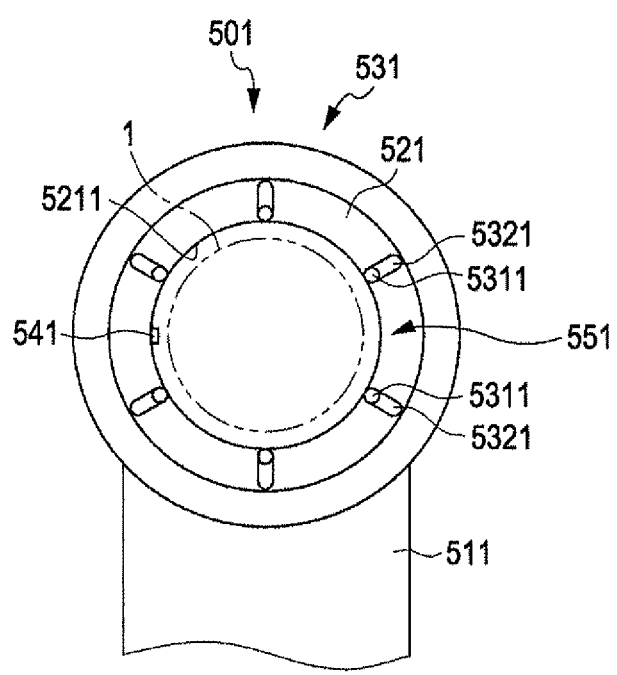
FIG. 14 is a front view of a yarn hooking device of the hoop winding device seen from a direction of an arrow D in FIG. 12.

Next, the yarn hooking device 501 will be described. The yarn hooking device 501 temporarily holds the fiber bundle F when starting the hoop winding, and winds the fiber bundle F around the liner 1 from the starting position of the hoop winding. As illustrated in FIG. 14, the yarn hooking device 501 is mainly configured by a base 511, a holding table 521, the holding section 531, and a cutter 541. As illustrated in FIG. 12, the yarn hooking device 501 is arranged at a position facing a surface where the winding of the fiber bundle F is carried out with a hoop winding unit 331, that is, a surface on which the bobbins 71 (71A, 71B, 71C, 71D), the fiber supply guide 72, and the like are arranged. The yarn hooking device 501 is mounted on the hoop winding device rail 12, and can relatively move with respect to the hoop winding unit 33.

The base 511 supports the holding table 521. The base 511 is mounted on the hoop winding device rail 12, and moves with respect to the main base 10 by a power mechanism. The power mechanism for moving the base 511 is connected to the control section 80, and the relative position with respect to the hoop winding unit 33 is controlled based on the signal from the control section 80.

The holding section 531 is arranged on a surface on the hoop winding unit 33 side of the holding table 521. The holding section 531 can wind the fiber bundle F by the hoop winding unit 33, and temporarily hold the fiber bundle F on the outer side in the radial direction of the liner 1. The holding section 531 is configured by a plurality of holding members 5311. An opening 5211, through which the liner 1 is inserted, is provided at the center of the holding table 521, where the plurality of holding members 5311 are arranged to surround the liner 1 inserted into the opening 5211 in a peripheral direction. In the present embodiment, six holding members 5311 are arranged at equal intervals on the same circumference to surround the liner 1. The fiber bundle F is wound so as to be hooked to the plurality of holding members 5311 on the outer side of the liner 1.

A gap is formed between a pair of adjacent holding members 5311. This gap forms a guiding section 551 that guides the fiber bundle F from the liner 1 to the holding section 531 in a retreating operation to be described later. Each of the holding members 5311 is supported by a rail 5321 at the holding table 521, and is movable in the radial direction of the holding table 521. Each holding member 5311 can move in the radial direction of the holding table 521 by a power mechanism. The power mechanism for moving each holding member 5311 is connected to the control section 80, and the position in the radial direction is controlled based on the signal from the control section 80. The plurality of holding members 5311 are moved in the radial direction of the holding table 521 to enlarge or reduce the holding section 531 in the radial direction of the liner 1.

The cutter 541 cuts the fiber bundle F. The cutter 541 is fixed on the holding table 521 and is extensible. The cutter 541 cuts the fiber bundle F (a part FB of the fiber bundle, see FIG. 18) bridged from the holding section 531 to the liner 1 in a first cutting operation, to be described later, and cuts the fiber bundle F (a part FC of the fiber bundle, see FIG. 23) bridged from the liner 1 to the holding section 531 in a second cutting operation. At other standby times, the cutter 541 is retreated to a position not making contact with the fiber bundle F.

Next, the operation of the hoop winding device 301 in the hoop winding of the FW device 1001 having the above structure will be described. The operation of the hoop winding device 301 in the hoop winding includes a winding starting operation, a first cutting operation, a winding operation, a retreating operation, and a second cutting operation. The liner 1 used in the present embodiment includes a tubular portion 1A having a constant radius, and a dome portion 1B arranged at both ends of the tubular portion 1A (see FIG. 12). The liner 1 is mounted to the liner transfer device 20, and the hoop winding of the first layer is carried out directly on the surface of the tubular portion 1A of the liner 1 in a state where the fiber layer is not yet formed on the liner 1. The position to start the hoop winding with respect to the liner 1 is a starting position M located close to the center of the liner 1 in the axial direction (see FIG. 15).

The control section 80 is input with the winding conditions of the hoop winding, that is, the winding conditions set by the operator in advance such as the movement speed of the hoop winding device 301, the rotation speed of the winding table 34, the number of times to reciprocate the hoop winding device 301, and the movement distance of the hoop winding device 301. Other operation conditions of the hoop winding device 301 may also be set in advance. The control section 80 controls the driving of the hoop winding device 301 based on the input winding conditions in the following manner.

Figure 15:
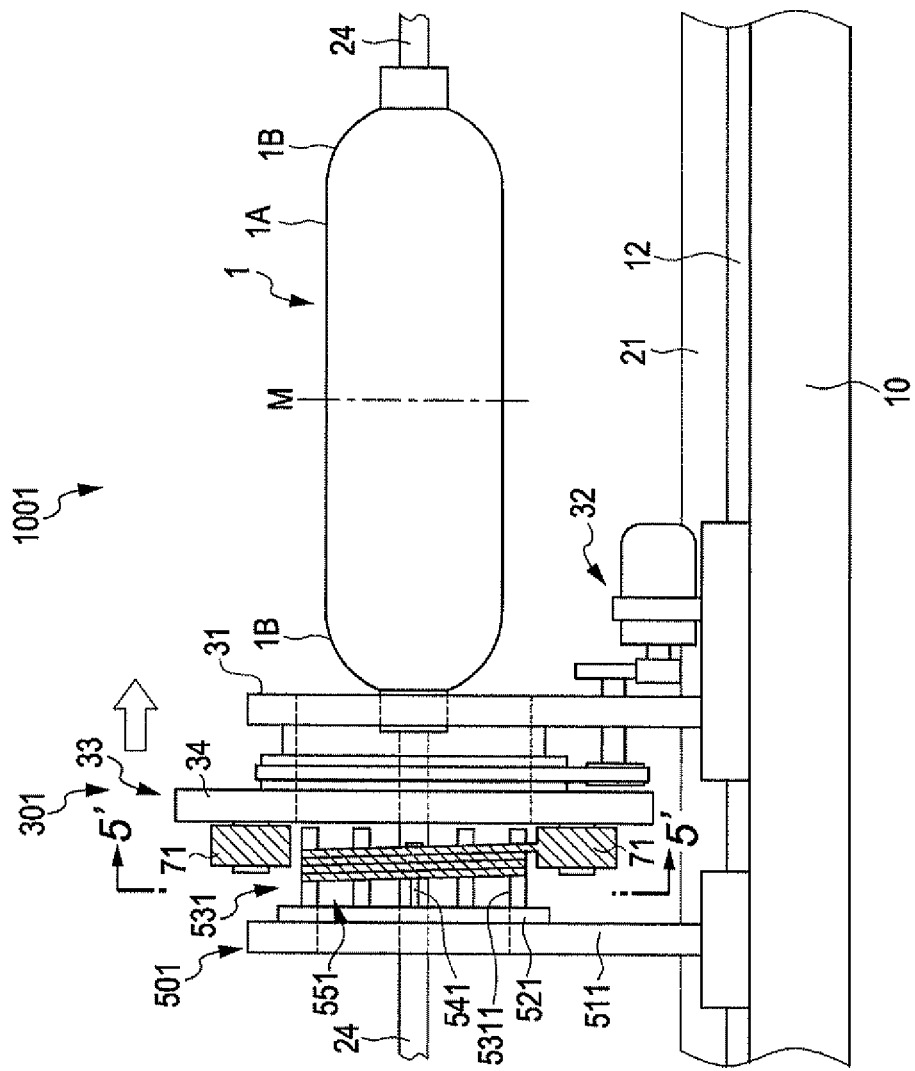
FIG. 15 is a side view of the hoop winding device and the liner illustrating a state of a winding starting operation.
Figure 16:
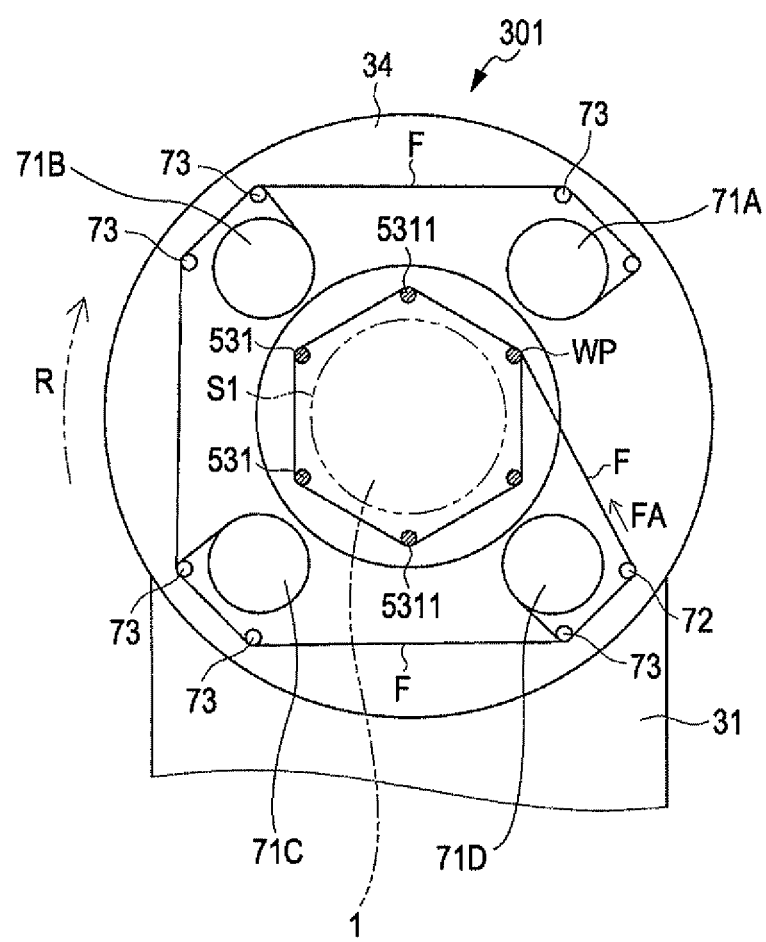
FIG. 16 is a cross-sectional view of the hoop winding device and the liner cut along line 5'-5' of FIG. 15.

First, the control section 80 controls the winding starting operation. In the winding starting operation, before starting the hoop winding on the liner 1, as illustrated in FIG. 15 and FIG. 16, the fiber bundle F is wound around the holding section 531 of the yarn hooking device 501 for an appropriate number of times by the hoop winding member 33, to temporarily hold the fiber bundle. The end of the fiber bundle F is fixed to the holding section 531 in advance with a tape or the like so as not to detach. For the first few windings, the subsequent fiber bundle F is wound to overlap the fiber bundle F wound underneath such that the fiber bundles F are not displaced.

When winding the fiber bundle F on the holding section 531, the hoop winding member 33 and the holding section 531 are brought close to each other such that the winding position WP of the fiber bundle F is on the holding section 531. The relative distance between the hoop winding member 33 and the yarn hooking device 501 is gradually increased such that the winding position WP of the fiber bundle F gradually moves towards the free end of the holding section 531. Only one of the hoop winding member 33 and the yarn hooking device 501 may be moved to change the relative distance between the hoop winding member 33 and the yarn hooking device 501, or both of the hoop winding member 33 and the yarn hooking device 501 may be moved to change the relative distance.

Figure 17:
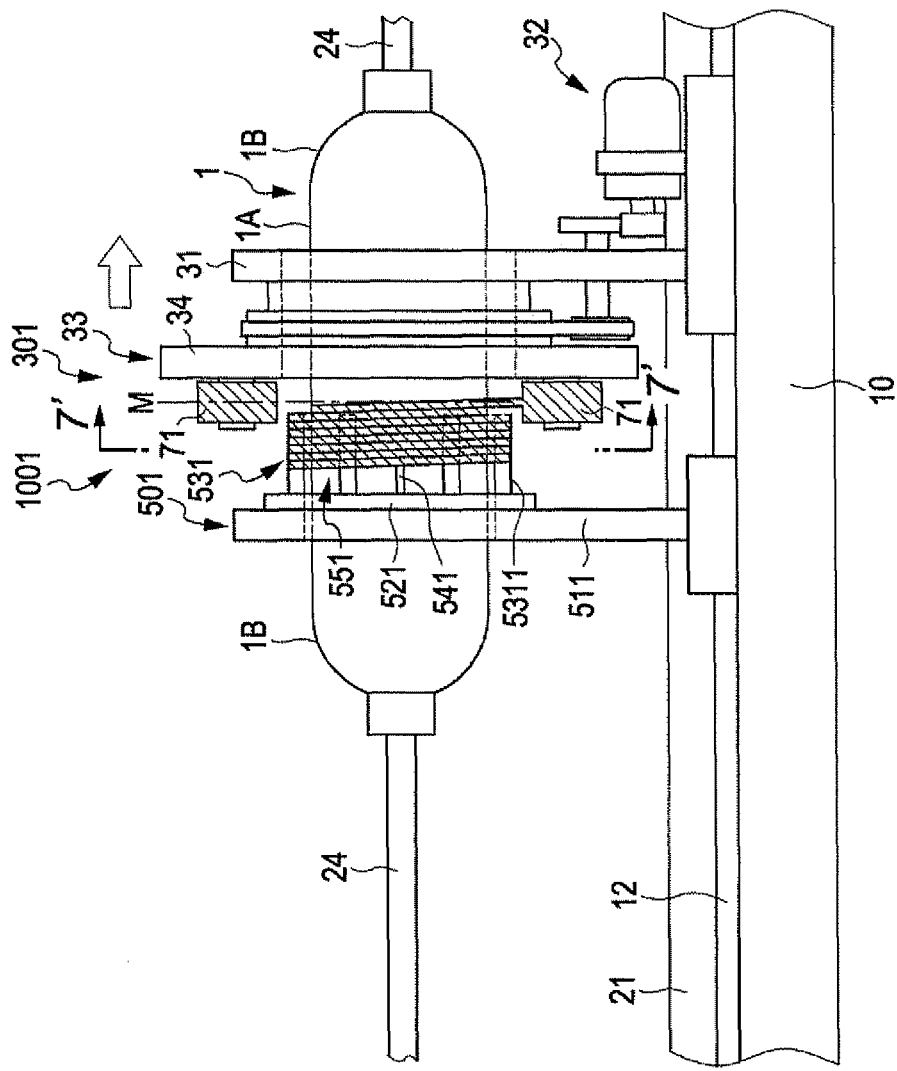
FIG. 17 is a side view of the hoop winding device and the liner illustrating a state of the winding starting operation.

As illustrated in FIG. 15, the winding of the fiber bundle F around the holding section 531 is carried out at a position located away from the starting position M of starting the hoop winding on the liner 1, but the winding may be carried out at a position located close to the starting position M (see FIG. 17). Alternatively, the fiber bundle F may be wound around the holding section 531 while bringing the hoop winding member 33 and the yarn hooking device 501 close to the starting position M.

Figure 18:
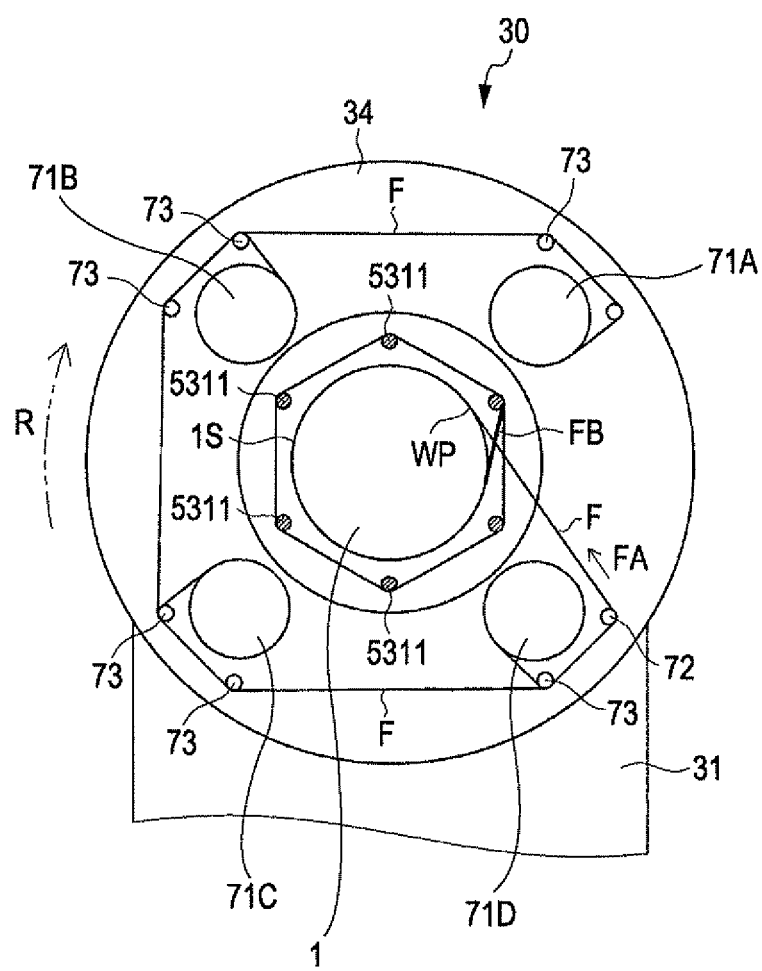
FIG. 18 is a cross-sectional view of the hoop winding device and the liner cut along line 7'-7' of FIG. 17.

After winding the fiber bundle F around the holding section 531 for an appropriate number of times, as illustrated in FIG. 17 and FIG. 18, the control section 80 moves the winding position WP of the fiber bundle F from the holding section 531 to the liner 1 to start the hoop winding of the fiber bundle F around the liner 1 at the starting position M of the hoop winding. In order to move the winding position WP of the fiber bundle F from the holding section 531 to the liner 1, the relative distance between the hoop winding member 33 and the yarn hooking device 501 is increased and the winding position WP of the fiber bundle F is moved from the free end of the holding section 531 to the liner 1. In other words, the winding position WP of the fiber bundle F is lowered from the holding section 531 to the liner 1. For example, by positioning the free end of the holding section 531 at the starting position M of the hoop winding and moving only the yarn hooking device 501 in the left side direction illustrated in FIG. 17, the winding position WP of the fiber bundle F can be moved from the holding section 531 to the liner 1 at the starting position M of the hoop winding. When the winding position WP of the fiber bundle F is moved from the holding section 531 to the liner 1, the fiber bundle F is bridged from the holding member 5311 to the liner 1. This portion is indicated with a thick line in FIG. 18 (a part FB of fiber bundle).

At the time that hoop winding has been carried out for a few windings from the starting position M of the hoop winding, the control section 80 controls the first cutting operation. In the first cutting operation, the fiber bundle F (the part FB of fiber bundle illustrated in FIG. 18) bridged from the holding section 531 to the liner 1 is cut with the cutter 541. Since the first cutting operation is carried out after the hoop winding is carried out for a few windings, the fiber bundle F hoop-wound around the liner 1 is not unwound even if the first cutting operation is carried out. Since the fiber bundle F wound around the holding section 531 and the fiber bundle F hoop wound around the liner 1 are separated by the first cutting operation, the hoop winding member 33 and the yarn hooking device 501 can move to positions spaced apart from each other.

Figure 19:
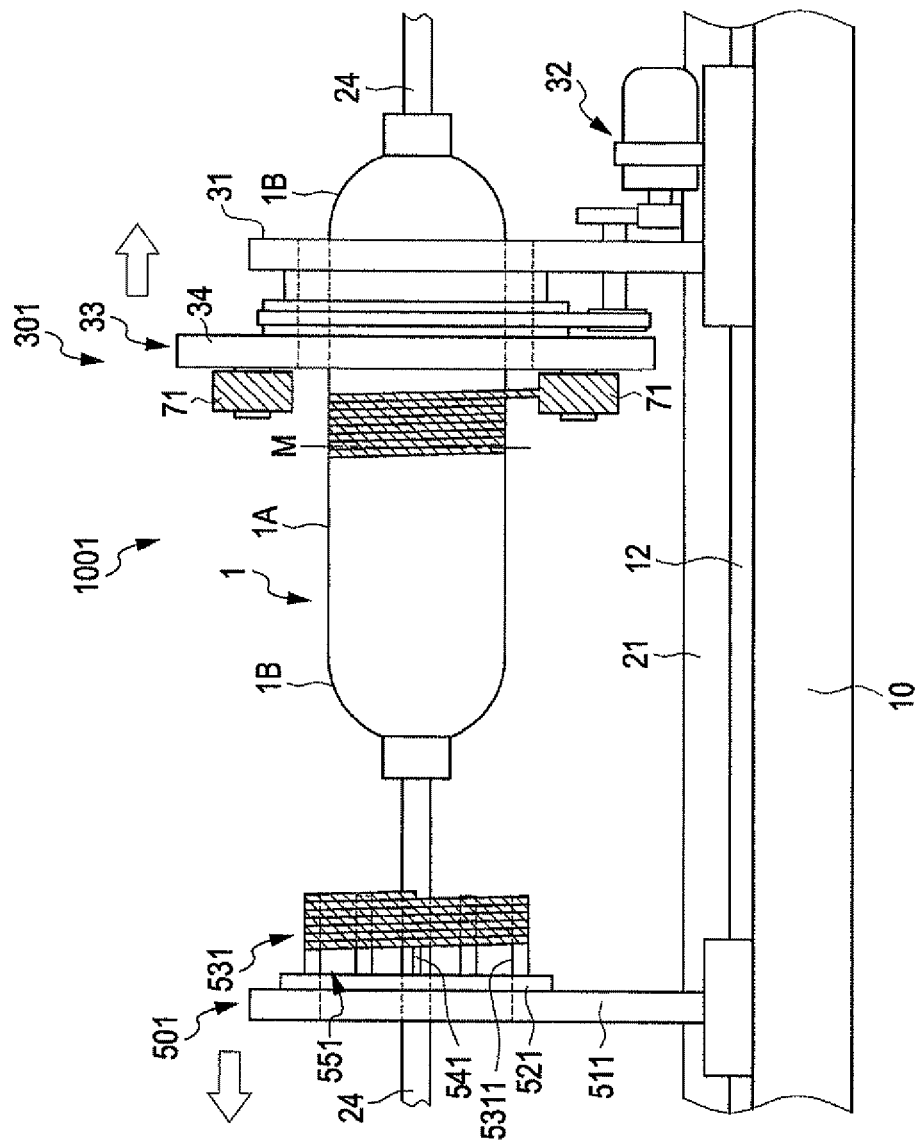
FIG. 19 is a side view of the hoop winding device and the liner illustrating a state of the winding operation.

As illustrated in FIG. 19, the control section 80 controls the winding operation of carrying out the hoop winding of the fiber bundle F with respect to the liner 1. As illustrated in FIG. 19, the control section 80 causes the hoop winding member 33 to carry out the hoop winding based on the winding conditions input in advance. The control section 80 causes the yarn hooking device 501 to retreat to the retreated position where the hoop winding is not obstructed by the hoop winding member 33. The fiber bundle F wound around the holding section 531 is removed at the retreated position.

Figure 20:
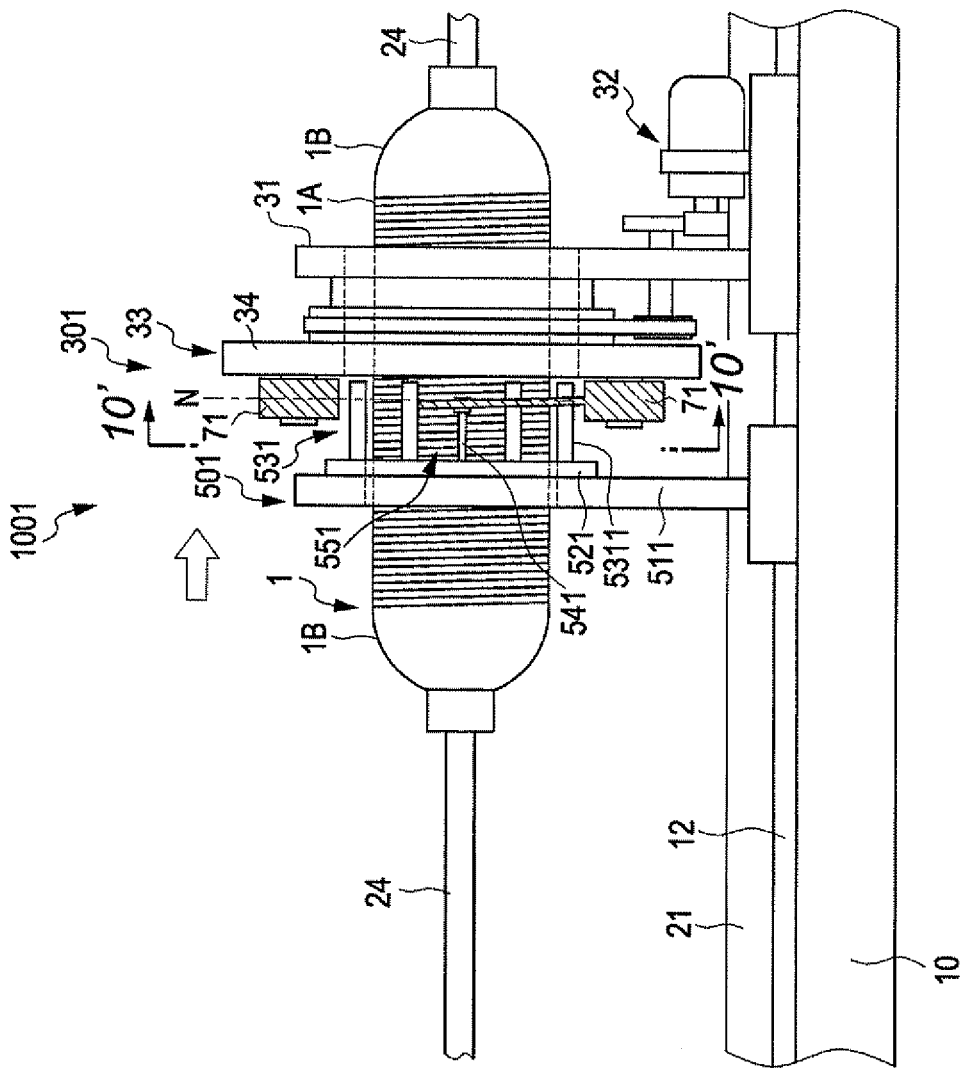
FIG. 20 is a side view of the hoop winding device and the liner illustrating a state of a retreating operation.
Figure 21:
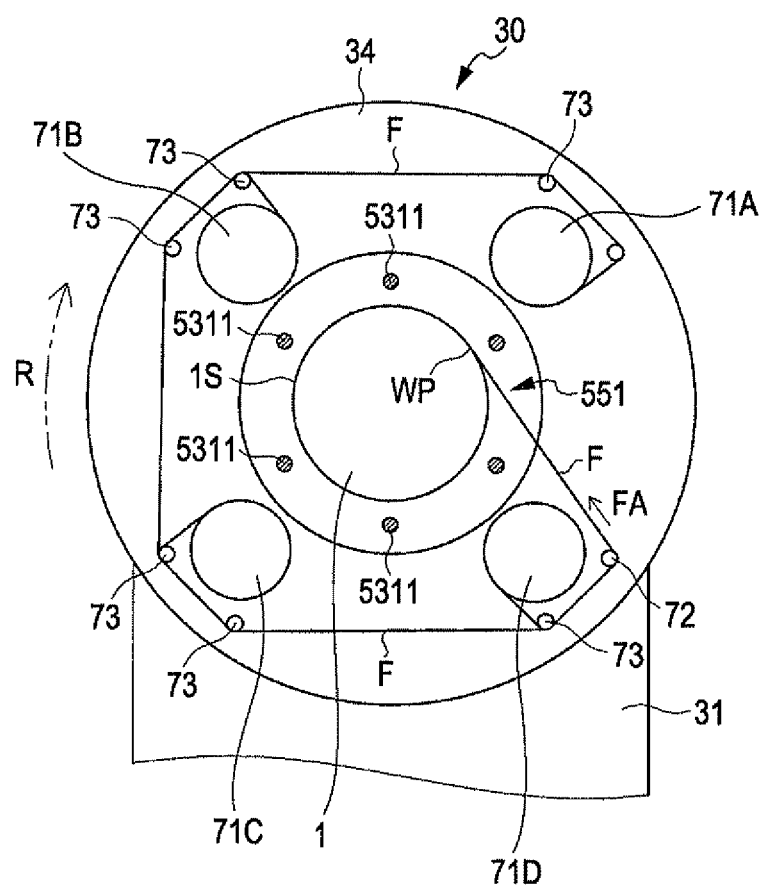
FIG. 21 is a cross-sectional view of the hoop winding device and the liner cut along line 10'-10' of FIG. 20.

As illustrated in FIGS. 20 and 21, when the winding position WP of the hoop winding reaches the ending position N (same position as starting position M), the control section 80 controls the retreating operation. The control section 80 first stops the rotation of the winding table 34 of the hoop winding member 33 and stops the hoop winding. Then, the yarn hooking device 501 is brought close to the hoop winding member 33. When the free end of the holding section 531 is passed through the winding position WP and brought closer to the hoop winding member 33 than the winding position WP, the fiber bundle F is inserted to the guiding section 551 of the holding section 531.

Figure 22:
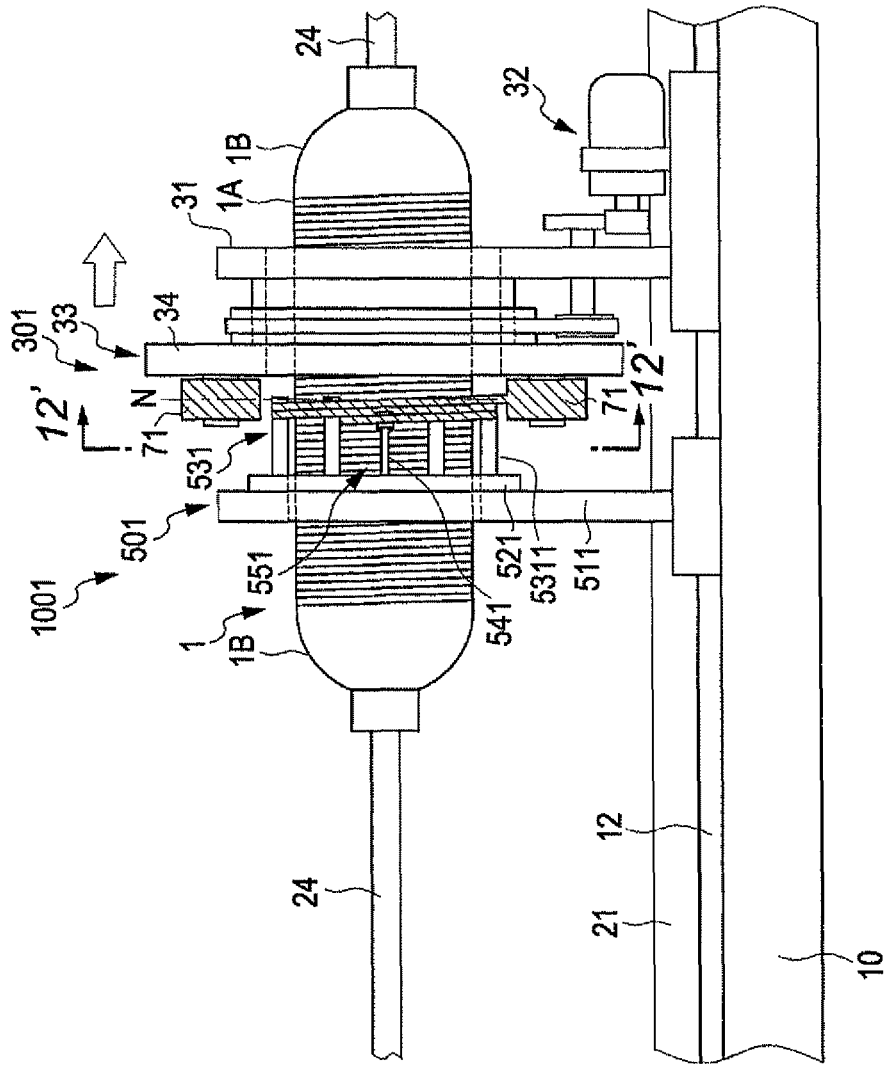
FIG. 22 is a side view of the hoop winding device and the liner illustrating a state of the retreating operation.
Figure 23:
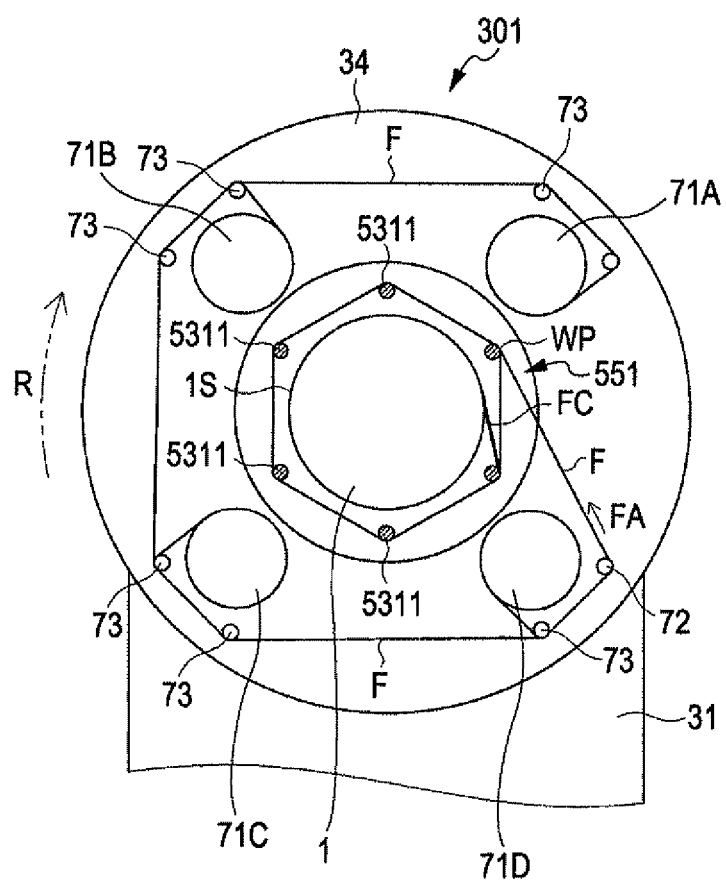
FIG. 23 is a cross-sectional view of the hoop winding device and the liner cut along line 12'-12' of FIG. 22.

As illustrated in FIG. 22 and FIG. 23, the rotation of the winding table 34 of the hoop winding member 33 is resumed with the fiber bundle F inserted to the guiding section 551 of the holding section 531, and the winding position WP of the fiber bundle F is moved from the liner 1 to the holding section 531. In other words, the winding position WP of the fiber bundle F is raised from the liner 1 to the holding section 531. When the winding position WP of the fiber bundle F is moved from the liner 1 to the holding section 531, the fiber bundle F is bridged from the liner 1 to the holding member 5311. This portion is indicated with a thick line in FIG. 23 (a part FC of fiber bundle). The fiber bundle F is held at the holding section 531 by winding the fiber bundle F around the holding section 531 for only an appropriate number of times. For the first few windings, the subsequent fiber bundle F is wound to overlap the fiber bundle F wound underneath such that the fiber bundles F are not displaced.

At the time that fiber bundle F is wound around the holding section 531 for an appropriate number of times from the ending position N of the hoop winding, the control section 80 controls the second cutting operation. In the second cutting operation, the fiber bundle F (the part FC of fiber bundle illustrated in FIG. 23) bridged from the liner 1 to the holding section 531 is cut with the cutter 541. Since the second cutting operation is carried out after the fiber bundle F is wound around the holding section 531 an appropriate number of times, the fiber bundle F wound around the holding section 531 is not unwound even if the second cutting operation is carried out. Since the fiber bundle F wound around the holding section 531 and the fiber bundle F hoop-wound around the liner 1 are separated by the second cutting operation, the hoop winding member 33 and the yarn hooking device 501 can move to positions spaced apart from each other. Furthermore, since the fiber bundle F is wound around the holding section 531 of the yarn hooking device 501 for an appropriate number of times by the hoop winding member 33, and the fiber bundle is in a temporarily held state, the operation of the next hoop winding can be started in this state.

The FW device 1001 according to the second embodiment described above has the following effects.

When starting the hoop winding, the winding position WP of the fiber bundle F is moved from the holding section 531 to the liner 1 at the starting position M of the hoop winding, and the winding starting operation of starting the hoop winding of the fiber bundle F around the liner 1 is carried out. When ending the hoop winding, the winding position WP of the fiber bundle F is moved from the liner 1 to the holding section 531 at the ending position N of the hoop winding, and the retreating operation of winding the fiber bundle F around the holding section 531 to hold the fiber bundle F is carried out. When starting the hoop winding in such a manner, the winding position WP of the fiber bundle F is moved from the holding section 531 to the liner 1 at the starting position M of the hoop winding. Consequently, easy winding and combination winding of the fiber bundle F are not necessary when starting the hoop winding regardless of whether or not the fiber layer is formed on the liner 1, and the time required for the hoop winding can be reduced. Since easy winding and combination winding of the fiber bundle F are not necessary, the usage amount of the fiber bundle F can be reduced and the manufacturing cost can be reduced.

In the winding starting operation and the retreating operation, the relative position between the hoop winding member 33 and the holding section 531 is changed in the axial direction of the liner 1. The winding starting operation and the retreating operation thus can be carried out with fewer operations.

The holding section 531 is configured by a plurality of holding members 5311 arranged in the circumferential direction of the liner 1, and each of the holding members 5311 is moved in the radial direction of the liner 1 to enlarge or reduce the holding section 531. Thus, the liner 1 of different radius can be easily responded.

The holding section 531 includes the guiding section 551 that guides the fiber bundle F from the liner 1 to the holding section 531 in the retreating operation. Thus, the fiber bundle F can be reliably wound around the holding section 531 in the retreating operation.

Another embodiment of the invention has been described above, but the invention is not limited to this embodiment and various modifications can be made. For example, the yarn hooking device 501 is a separate body from the hoop winding member 33, but the holding section 531 may be arranged in the hoop winding member 33.

The holding section 531 is configured by columnar holding members 5311, but the present invention is not limited thereto, and the holding section 531 may have a cylindrical shape, for example. In this case, a portion that guides the fiber bundle F to the holding section 531 such as a slit-like space having an end opened may be provided as the guiding section 551.

In the present embodiment, the FW device 100 including the hoop winding device 301 and the helical winding device 40 has been described, but the present invention may be applied to an FW device dedicated to hoop winding.

While the present invention has been described with respect to embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the invention.

What is claimed is:

1. A filament winding apparatus for winding a fiber bundle around a liner, the apparatus comprising:
    a hoop winding device including a winding section for performing hoop winding of the fiber bundle with respect to the liner, a holding section around which the fiber bundle is wound by the winding section and that temporarily holds the fiber bundle on an outer side in a radial direction of the liner, and a cutter for cutting the fiber bundle; and
    a control section for controlling, a winding starting operation of moving a winding position of the fiber bundle from the holding section to the liner to start the hoop winding of the fiber bundle around the liner at a starting position of the hoop winding after winding the fiber bundle around the holding section, a first cutting operation of cutting the fiber bundle bridged from the holding section to the liner by the cutter, a winding operation of performing the hoop winding of the fiber bundle with respect to the liner, a retreating operation of moving the winding position of the fiber bundle from the liner to the holding section to wind the fiber bundle around the holding section and hold the fiber bundle at an ending position of the hoop winding, and a second cutting operation of cutting the fiber bundle bridged from the liner to the holding section by the cutter.

2. The filament winding apparatus according to claim 1, wherein the control section performs control to change a relative position between the winding section and the holding section in an axial direction of the liner in the winding starting operation and the retreating operation.

3. The filament winding apparatus according to claim 1, wherein the holding section is configured by a plurality of members arranged in a circumferential direction of the liner, the plurality of members being moved in the radial direction of the liner to enlarge or reduce the holding section.

4. The filament winding apparatus according to claim 2, wherein the holding section is configured by a plurality of members arranged in a circumferential direction of the liner, the plurality of members being moved in the radial direction of the liner to enlarge or reduce the holding section.

5. The filament winding apparatus according to claim 1, wherein the holding section includes a guiding section for guiding the fiber bundle from the liner to the holding section in the retreating operation.

6. The filament winding apparatus according to claim 2, wherein the holding section includes a guiding section for guiding the fiber bundle from the liner to the holding section in the retreating operation.

7. The filament winding apparatus according to claim 3, wherein the holding section includes a guiding section for guiding the fiber bundle from the liner to the holding section in the retreating operation.

8. The filament winding apparatus according to claim 4, wherein the holding section includes a guiding section for guiding the fiber bundle from the liner to the holding section in the retreating operation.

* * * * *